United States Patent
Choi et al.

(10) Patent No.: US 10,812,242 B2
(45) Date of Patent: Oct. 20, 2020

(54) METHOD AND APPARATUS FOR TRANSMITTING DIFFERENT UPLINK CONTROL INFORMATION IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Gyeonggi-do (KR); Taehyoung Kim, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 6 days.

(21) Appl. No.: 16/241,016

(22) Filed: Jan. 7, 2019

(65) Prior Publication Data
US 2019/0215126 A1    Jul. 11, 2019

(30) Foreign Application Priority Data
Jan. 5, 2018    (KR) .................. 10-2018-0001485

(51) Int. Cl.
*H04W 72/04* (2009.01)
*H04L 5/00* (2006.01)
*H04W 72/12* (2009.01)

(52) U.S. Cl.
CPC ....... *H04L 5/0055* (2013.01); *H04W 72/0413* (2013.01); *H04W 72/0446* (2013.01); *H04W 72/1205* (2013.01)

(58) Field of Classification Search
CPC ....... H04L 1/1671; H04L 1/18; H04L 1/1861; H04L 5/0055; H04W 72/0413; H04W 72/0446; H04W 72/1205

USPC ......................................................... 370/329
See application file for complete search history.

(56) References Cited

U.S. PATENT DOCUMENTS

| | | | |
|---|---|---|---|
| 2012/0307773 A1 | 12/2012 | Tiirola et al. | |
| 2014/0078942 A1 | 3/2014 | Noh et al. | |
| 2018/0131425 A1* | 5/2018 | Li | H04B 7/088 |
| 2019/0239216 A1* | 8/2019 | Kundu | H04L 5/0044 |
| 2019/0261391 A1* | 8/2019 | Kundu | H04L 25/0226 |
| 2019/0306922 A1* | 10/2019 | Xiong | H04W 72/0446 |
| 2019/0386764 A1* | 12/2019 | Choi | H04J 11/0059 |

(Continued)

OTHER PUBLICATIONS

Ericsson, Summary of discussions on Multiplexing different UCI types on PUCCH resource, 3GPP TSG RAN WG1 meeting (Year: 2018).*

(Continued)

*Primary Examiner* — Robert J Lopata
(74) *Attorney, Agent, or Firm* — The Farrell Law Firm, P.C.

(57) ABSTRACT

A method by a terminal in a wireless communication system is provided. The method includes identifying a first physical uplink control channel (PUCCH) format for an acknowledgement/non-acknowledgement (ACK/NACK) and a second PUCCH format for a scheduling request (SR), identifying that a transmission of the ACK/NACK and a transmission of the SR overlap in a slot, transmitting, to a base station, the ACK/NACK in the slot based on the first PUCCH format being PUCCH format 0, and transmitting, to the base station the ACK/NACK without the SR in the slot, based on the first PUCCH format being PUCCH format 1 and the second PUCCH format is PUCCH format 0.

20 Claims, 14 Drawing Sheets

(56) References Cited

U.S. PATENT DOCUMENTS

2020/0008227 A1* 1/2020 Lee .................. H04W 28/0278

OTHER PUBLICATIONS

Ericsson, "On PUCCH Resource Allocation", R1-1721006, 3GPP TSG-RAN WG1 Meeting RAN #91, Nov. 27-Dec. 1, 2017, 11 pages.
LG Electronics, "Remaining Aspects of Short PUCCH for UCI of up to 2 Bits", R1-1719921, 3GPP TSG RAN WG1 Meeting #91, Nov. 27-Dec. 1, 2017, 7 pages.
Huawei, HiSilicon, "Short PUCCH for UCI of up to 2 Bits", R1-1719391, 3GPP TSG RAN WG1 Meeting #91, Nov. 27-Dec. 1, 2017, 10 pages.
International Search Report dated Apr. 2, 2019 issued in counterpart application No. PCT/KR2018/016929, 3 pages.

\* cited by examiner

METHOD AND APPARATUS FOR TRANSMITTING DIFFERENT UPLINK CONTROL INFORMATION IN WIRELESS COMMUNICATION SYSTEM

CROSS-REFERENCE TO RELATED APPLICATIONS(S)

This application is based on and claims priority under 35 U.S.C. § 119(a) to Korean Patent Application Serial No. 10-2018-0001485, filed on Jan. 5, 2018, in the Korean Intellectual Property Office, the entire disclosure of which is incorporated herein by reference.

BACKGROUND

1. Field

The present disclosure relates generally to a wireless communication system and to a method for setting an uplink control channel transmission resource in a next generation mobile communication system.

2. Description of Related Art

To meet the increased demand for wireless data traffic since deployment of 4G communication systems, efforts have been made to develop an improved 5G or pre-5G communication system. Therefore, the 5G or pre-5G communication system is also called a 'beyond 4G network' or a 'post long term evolution (LTE) System'. The 5G communication system is considered to be implemented in higher frequency (mmWave) bands (e.g., 60 GHz bands) so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

With the recent development of LTE and LTE-Advanced, a method and an apparatus for setting an uplink control channel transmission resource are required in the next generation mobile communication system.

Unlike the existing wireless communication systems, the 5G wireless communication system aims to support not only services requiring high transmission speed but also services having very short transmission delay and services requiring high connection density. According to these scenarios, it is necessary to be able to provide various services with different transmission/reception techniques and transmission/reception parameters in one system in order to satisfy various requirements and services of users, and it is important to design so that the added services are not constrained by the current system in consideration of forward compatibility. Inevitably, the 5G system should be able to use time and frequency resources more flexibly than the existing LTE system. Specifically, it is very important to ensure flexibility in a control channel design. For this purpose, in the 5G communication system, the downlink control channel may be transmitted in a specific subband without being transmitted over the entire system band, and time and frequency resources for transmitting the downlink control channel may be configured in each terminal.

In order to achieve very high-speed data service of up to several Gbps in the 5G system, it is considered to transmit and receive signals in an ultra-wide bandwidth of several tens to several hundreds of MHz or several GHz. However, it is necessary to efficiently manage the power consumption of the terminal or the base station through the adaptation of the transmission/reception bandwidth in accordance with the relationship that the consumed power increases in proportion to the transmission/reception bandwidth. While the base station can be supplied with power at all times, the terminal has a relatively higher need for efficient power consumption management due to battery capacity limitations. Accordingly, when the ultra-wide bandwidth signal transmission/reception is not required for the terminal, the base station can efficiently manage the power consumption of the terminal by changing the transmission/reception bandwidth of the terminal to narrowband.

As described above, in the operation in which the transmission/reception bandwidth of the terminal is adapted or changed, the base station should efficiently configure a control resource set in which the downlink control channel is transmitted or resources in which the uplink control channel (PUCCH) is transmitted in the terminal in accordance with the case that each transmission/reception bandwidth is adapted.

SUMMARY

The present disclosure has been made to address at least the disadvantages described above and to provide at least the advantages described below.

In accordance with an aspect of the present disclosure, a method by a terminal in a wireless communication system is provided. The method includes identifying a first physical uplink control channel (PUCCH) format for an acknowledgement/non-acknowledgement (ACK/NACK) and a second PUCCH format for a scheduling request (SR), identifying that a transmission of the ACK/NACK and a transmission of the SR overlap in a slot, transmitting, to a base station, the ACK/NACK in the slot based on the first PUCCH format being PUCCH format 0, and transmitting, to the base station the ACK/NACK without the SR in the slot, based on the first PUCCH format being PUCCH format 1 and the second PUCCH format is PUCCH format 0.

In accordance with an aspect of the present disclosure, a method by a base station in a wireless communication system is provided. The method includes transmitting, to a terminal, information on a first PUCCH format for an ACK/NACK and information on a second PUCCH format for a SR, a transmission of the ACK/NACK and a transmission of the SR overlap in a slot, receiving, from the terminal, the ACK/NACK in the slot, based on the first PUCCH format being PUCCH format 0, and receiving, from the terminal, the ACK/NACK without the SR in the slot, based on the first PUCCH format being PUCCH format 1 and the second PUCCH format is PUCCH format 0.

In accordance with an aspect of the present disclosure, a terminal in a wireless communication system is provided. The terminal includes a transceiver configured to transmit and receive a signal and a processor configured to identify a first PUCCH format for an ACK/NACK and a second PUCCH format for a SR, identify that a transmission of the ACK/NACK and a transmission of the SR overlap in a slot, transmit, to a base station, the ACK/NACK in the slot based on the first PUCCH format being PUCCH format 0, and transmit, to the base station, the ACK/NACK without the SR in the slot based on the first PUCCH format being PUCCH format 1 and the second PUCCH format is PUCCH format 0.

In accordance with an aspect of the present disclosure, a base station in a wireless communication system is provided. The base station includes a transceiver configured to transmit and receive a signal and a processor configured to transmit, to a terminal, information on a first PUCCH format for an ACK/NACK and information on a second PUCCH format for a SR, a transmission of the ACK/NACK and a transmission of the SR overlap in a slot, receive, from the terminal, the ACK/NACK in the slot based on the first PUCCH format being PUCCH format 0, and receive, from the terminal, the ACK/NACK without the SR in the slot based on the first PUCCH format being PUCCH format 1 and the second PUCCH format is PUCCH format 0.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
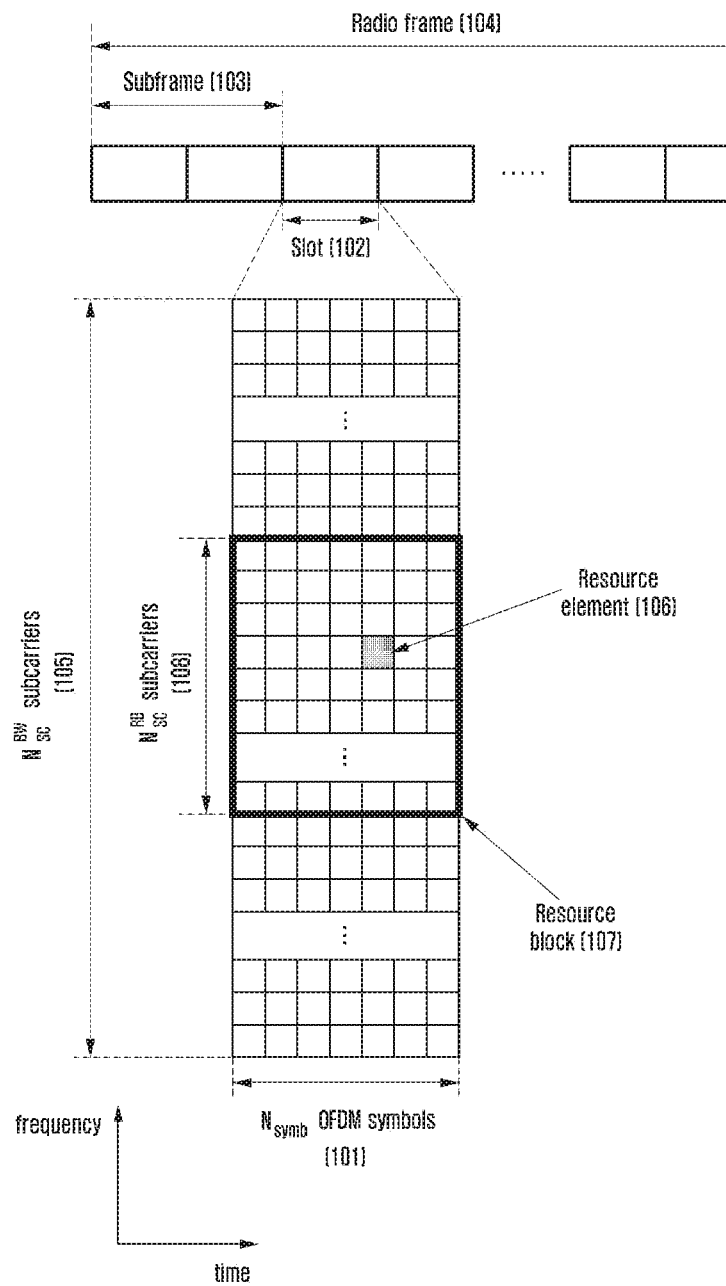
FIG. 1 is a diagram of a basic structure of a time-frequency domain in the LTE.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

A wireless communication system has been developed from a wireless communication system providing a voice centered service in the early to stage toward broadband wireless communication systems providing high-speed, high-quality packet data services, like communication standards of high speed packet access (HSPA), LTE or evolved universal terrestrial radio access (E-UTRA), LTE-advanced (LTE-A), and LTE-Pro of the 3GPP, high rate packet data (HRPD) and ultra mobile broadband (UMB) of 3GPP2, IEEE 802.16e and the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a user equipment (UE) or a mobile station (MS) transmits data or a control signal to a base station (eNode B or base station (BS)) and the downlink refers to a radio link through which a base station transmits data or a control signal to a terminal. The multiple access scheme as described above normally allocates and operates time-frequency resources where data or control information is transmitted to each user to prevent the time-frequency resources from overlapping with each other (i.e., establish orthogonality), thereby dividing the data or the control information of each user.

As a future communication system since the LTE, a 5G communication system has to be able to freely reflect various requirements, such as a user and a service provider, a service satisfying various requirements needs to be supported at the same time. The services considered for the 5G communication system include enhanced mobile broadband (eMBB) communication, massive machine type communication (mMTC), ultra reliability low latency communication (URLLC), etc.

The eMBB aims to provide a higher data transfer rate than a data transfer rate supported by the existing LTE, LTE-A, or LTE-Pro. For example, in the 5G communication system, the eMBB should be able to provide a peak data rate of 20 Gbps in the downlink and a peak data rate of 10 Gbps in the uplink from the viewpoint of one base station. In addition, the 5G communication system should provide the increased user perceived data rate of the terminal simultaneously with providing the peak data rate. In order to satisfy such the requirement, improvement of various transmitting and receiving technologies including a further improved MIMO transmission technology is demanded. In addition, signals are transmitted using the transmission bandwidth of up to 20 MHz in the 2 GHz band used by the current LTE, but the 5G communication system uses a frequency bandwidth wider than 20 MHz in the frequency band of 3 to 6 GHz or more than 6 GHz, thereby satisfying the data transmission rate required in the 5G communication system.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the Internet of things. The Internet of things needs to be able to support a large number of terminals (for example, 1,000,000 terminals/km$^2$) in a cell because it is attached to various sensors and various devices to provide communication functions. In addition, the terminal supporting the mMTC are more likely to be positioned in shaded areas not covered by a cell, such as an underground of building due to nature of services. Thus, the terminal requires a wider coverage than other services provided by the 5G communication system. The terminals that support the mMTC should be configured as inexpensive terminals and require very long battery life time, such as 10 to 15 years, because it is difficult to frequently replace the battery of the terminal.

Finally, in the case of the URLLC, it is a cellular-based wireless communication service used for mission-critical purposes. For example, services used for a remote control for a robot or machinery, industrial automation, unmanaged aerial vehicle, remote health care, emergency situation alert, and the like may be considered. Therefore, the communication provided by the URLLC should provide very low latency and very high reliability. For example, a service that supports URLLC should meet air interface latency of less than 0.5 milliseconds and at the same time have requirements of a packet error rate less than 10-5. Therefore, for the service that supports the URLLC, the 5G system should provide a transmission time interval (TTI) smaller than other services, and at the same time, design matters for allocating a wide resource in the frequency band in order to secure the reliability of the communication link are required.

5G services (e.g., eMBB, URLLC, and mMTC) can be multiplexed and transmitted in one system. In this case, different transmission/reception techniques and transmission/reception parameters may be used between services in order to satisfy different requirements of the respective services.

Hereinafter, the frame structure of the LTE and LTE-A systems will be described in more detail with reference to the drawings.

FIG. 1 is a diagram of a basic structure of a time-frequency domain that is a radio resource area in which data or a control channel is transmitted in a downlink, in the LTE system.

In FIG. 1, an abscissa represents a time domain and an ordinate represents a frequency domain. A minimum transmission unit in the time domain is an OFDM symbol, in which one slot 102 is configured by collecting $N_{symb}$ OFDM symbols 101 and one subframe 103 is configured by collecting two slots. A length of the slot is 0.5 ms and a length of the subframe is 1.0 ms. Further, a radio frame 104 is a time domain unit consisting of 10 subframes. A minimum transmission unit in a frequency domain is a sub-carrier, in which the entire system transmission bandwidth is composed of a total of New sub-carriers 105. A basic unit of resources in the time-frequency domain is a resource element (RE) 106 and may be represented by an OFDM symbol index and a sub-carrier index. A resource block (RB) 107 (or physical resource block (PRB)) is defined by the $N_{symb}$ continued OFDM symbols 101 in the time domain and $N_{RB}$ continued sub-carriers 108 in the frequency domain. Therefore, one RB 107 consists of $N_{symb} \times N_{RB}$ REs 106. In general, a minimum transmission unit of the data is the RB unit. In the LTE system, generally, $N_{symb}=7$ and $N_{RB}=12$ and New and $N_{RB}$ are proportional to the system transmission bandwidth.

Next, the downlink control information (DCI) in the LTE and LTE-A systems will be described in detail.

In the LTE system, the scheduling information for the downlink data or the uplink data is transmitted from the base station to the terminal through the DCI. The DCI is defined in various formats, and thus the DCI formats are applied depending on whether the DCI is the scheduling information on the uplink data and the scheduling information on the downlink data, whether the DCI is compact DCI having a small size of control information, whether to apply spatial multiplexing using a multiple antenna, whether the DCI is DCI for a power control, and the like and are operated. For example, DCI format 1 that is the scheduling control information on the downlink data is configured to include at least following control information.

(1) Resource allocation type 0/1 flag: It is notified whether a resource allocation scheme is type 0 or type 1. The type 0 applies a bitmap scheme to allocate a resource in a resource block group (RBG) unit. In the LTE system, a basic unit of the scheduling is the RB represented by the time-frequency domain resource and the RBG is configured of a plurality of RBs and thus becomes the basic unit of the scheduling in the type 0 scheme. The type 1 allocates a specific RB within the RBG.

(2) Resource block allocation: The RB allocated for the data transmission is notified. The represented resource is determined depending on the system bandwidth and the resource allocation scheme.

(3) Modulation and coding scheme (MCS): The modulation scheme used for the data transmission and a size of a transport block that is the data to be transmitted are notified.

(4) Hybrid automatic repeat request (HARQ) process number: An HARQ process number is notified.

(5) New data indicator A HARQ initial transmission or retransmission is notified.

(6) Redundancy version: A HARQ redundancy version is notified.

(7) Transmit power control (TPC) command for PUCCH: A transmit power control command for the PUCCH that is an uplink control channel is notified.

The DCI is subjected to a channel coding and modulation process and then is transmitted through a physical downlink control channel (PDCCH) or an enhanced PDCCH (EPDCCH) that is the physical downlink control channel.

A cyclic redundancy check (CRC) is attached to a payload of a DCI message, and the CRC is scrambled with a radio network temporary identifier (RNTI) corresponding to identity of the terminal. Different RNTIs are used depending on the purpose of the DCI message (e.g. UE-specific data transmission, power control command, or random access response). The RNTI is not explicitly transmitted but is transmitted by being included in the CRC computation process. Upon receiving the DCI message transmitted onto the PDCCH, the terminal checks the CRC using the allocated RNTI. If the confirmation result of the CRC is correct, the terminal can know that the message is transmitted to the terminal.

Figure 2:
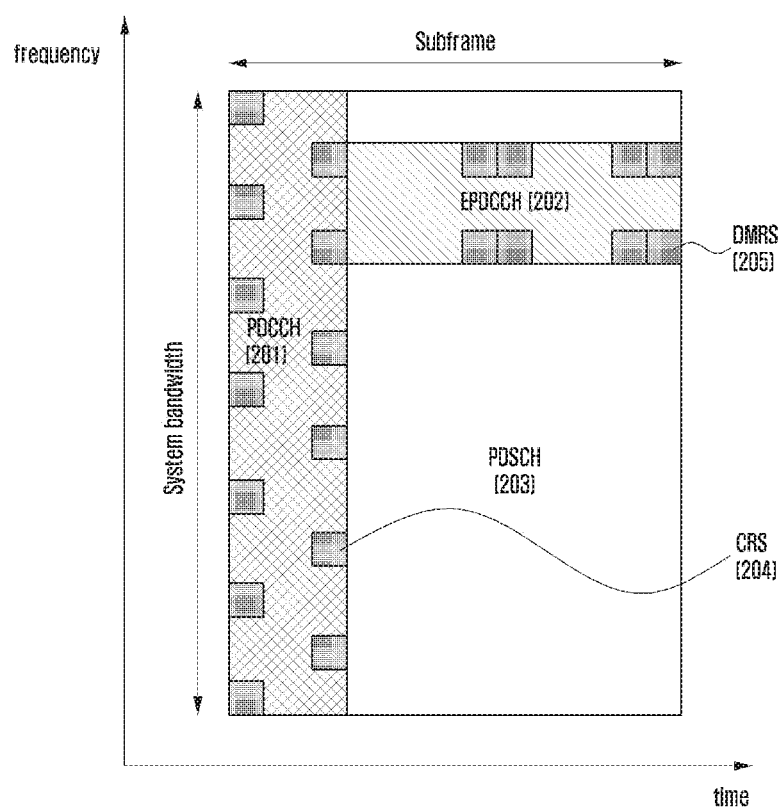
FIG. 2 is a diagram of downlink control channels of LTE.

FIG. 2 is a diagram of PDCCH 201 and EPDCCH 202, which are the physical downlink control channels through which the DCI of the LTE is transmitted.

Referring to FIG. 2, the PDCCH 201 is time multiplexed (TDM) with a PDSCH 203, which is a data transmission channel, and is transmitted over the entire system bandwidth. The area of the PDCCH 201 is represented by the number of OFDM symbols, which is indicated to the terminal by a control format indicator (CFI) transmitted through a physical control format indicator channel (PCFICH). The PDCCH 201 is allocated to the OFDM symbol at a head of a subframe so that the terminal may decode the downlink scheduling allocation as soon as possible. In this way, a decoding delay for a downlink shared channel (DL-SCH). The overall downlink transmission delay may be reduced. One PDCCH carries one DCI message and a plurality of terminals may be scheduled simultaneously on the downlink and uplink, so that a plurality of PDCCHs are simultaneously transmitted in each cell. A CRS 204 is used as a reference signal for decoding the PDCCH 201. The CRS 204 is transmitted every subframe over the entire band and its scrambling and resource mapping are changed according to cell identity (ID). UE-specific beamforming can not be used because the CRS 204 is a reference signal commonly used by all terminals. Therefore, the multi-antenna transmission technique for the PDCCH of the LTE is limited to open loop transmission diversity. The number of ports of the CRS is implicitly notified to the terminal from the decoding of a physical broadcast channel (PBCH).

The resource allocation of the PDCCH 201 is based on a control-channel element (CCE), and one CCE consisting of nine resource element groups (REGs), that is, a total of 36 REs. The number of CCEs required for a specific PDCCH 201 may be 1, 2, 4, or 8, which is changed depending on a channel coding rate of a DCI message payload. As such, the number of different CCEs are used to implement link adaptation of the PDCCH 201. The terminal should detect a signal without knowing information about the PDCCH 201. In the LTE, a search space representing a set of CCEs for blind decoding is defined. The search space includes a plurality of aggregates at the aggregation level (AL) of each CCE, which is not explicitly signaled but implicitly defined by function and subframe number by the terminal identity. In each subframe, the terminal decodes the PDCCH 201 for all possible resource candidates that may be generated from the CCEs in the set search space, and transmits the information which is declared to be valid to the terminal through the CRC check.

The search space is classified into a UE-specific search space and a common search space. The terminals in a certain group or all the terminals may investigate the common search space of the PDCCH 201 in order to receive cell-common control information such as dynamic scheduling or paging message for the system information. For example, the scheduling allocation information of the DL-SCH for a transmission of system information block (SIB)-1 including the cell operator information may be received by investigating the common search space of the PDCCH 201.

Referring to FIG. 2, an EPDCCH 202 is frequency-multiplexed (FDM) with a PDSCH 203 and transmitted. The base station may appropriately allocate the resources of the EPDCCH 202 and the PDSCH 203 through the scheduling, thereby effectively supporting the coexistence with the data transmission for the existing LTE terminal. However, since the EPDCCH 202 is allocated over one subframe on the time axis and transmitted, there is a problem in that a loss occurs in terms of transmission latency. A plurality of EPDCCHs 202 configures one EPDCCH 202 set and an EPDCCH 202 set is allocated in units of a physical resource block (PRB) pair. The position information on the EPDCCH set is set to be UE-specific and is signaled via a remote radio control (RRC). A maximum of two EPDCCH 202 sets may be configured in each terminal, and one EPDCCH 202 set may be multiplexed and configured in different terminals at the same time.

The resource allocation of the EPDCCH 202 is based on an enhanced CCE (ECCE), and one ECCE may consist of four or eight enhanced REGs (EREGs), and the number of EREGs per ECCE is changed depending on the CP length and the subframe configuration information. One EREG includes 9 REs, so there may be 16 EREGs per PRB pair. The EPDCCH transmission scheme is classified into localized/distributed transmission according to the RE mapping scheme of the EREG. The aggregation level of the ECCE may be 1, 2, 4, 8, 16 or 32, which is determined by a CP length, a subframe configuration, an EPDCCH format and a transmission scheme.

The EPDCCH 202 supports only the UE-specific search space. Therefore, the terminal which intends to receive a system message should investigate the common search space on the existing PDCCH 201.

In the EPDCCH 202, a demodulation reference signal (DMRS) 205 is used as a reference signal and a demodulation reference signal for decoding. Thus, the precoding for the EPDCCH 202 may be configured by the base station and the UE-specific beamforming may be used. Through the DMRS 205, the terminals may perform decoding on the EPDCCH 202 without knowing what precoding is used. In the EPDCCH 202, the same pattern as the DMRS 205 of the PDSCH 203 is used. However, unlike the PDSCH 203, the DMRS 205 in the EPDCCH 202 may support transmission using up to four antenna ports. The DMRS 205 is transmitted only in the corresponding PRB to which the EPDCCH is transmitted.

The port configuration information of the DMRS 205 is changed depending on the transmission scheme of the EPDCCH 202. With the localized transmission scheme, the antenna port corresponding to the ECCE to which the EPDCCH 202 is mapped is selected based on the ID of the terminal. If different terminals share the same ECCE (e.g., a multiuser MIMO transmission is used), the DMRS antenna port may be allocated to each terminal. Alternatively, the DMRS 205 may be shared and transmitted. The DMRS 205 may be divided into a scrambling sequence configured as higher layer signaling. With the distributed transmission scheme, up to two antenna ports of the DMRS 205 are supported, and a diversity technique of a precoder cycling scheme is supported. The DMRS 205 may be shared for all REs transmitted within one PRB pair.

In the above description, the downlink control channel transmission scheme in the conventional LTE and LTE-A and the RS for decoding the same are described.

Hereinafter, the downlink control channel in the currently discussed 5G communication system will be described in more detail.

Figure 3:
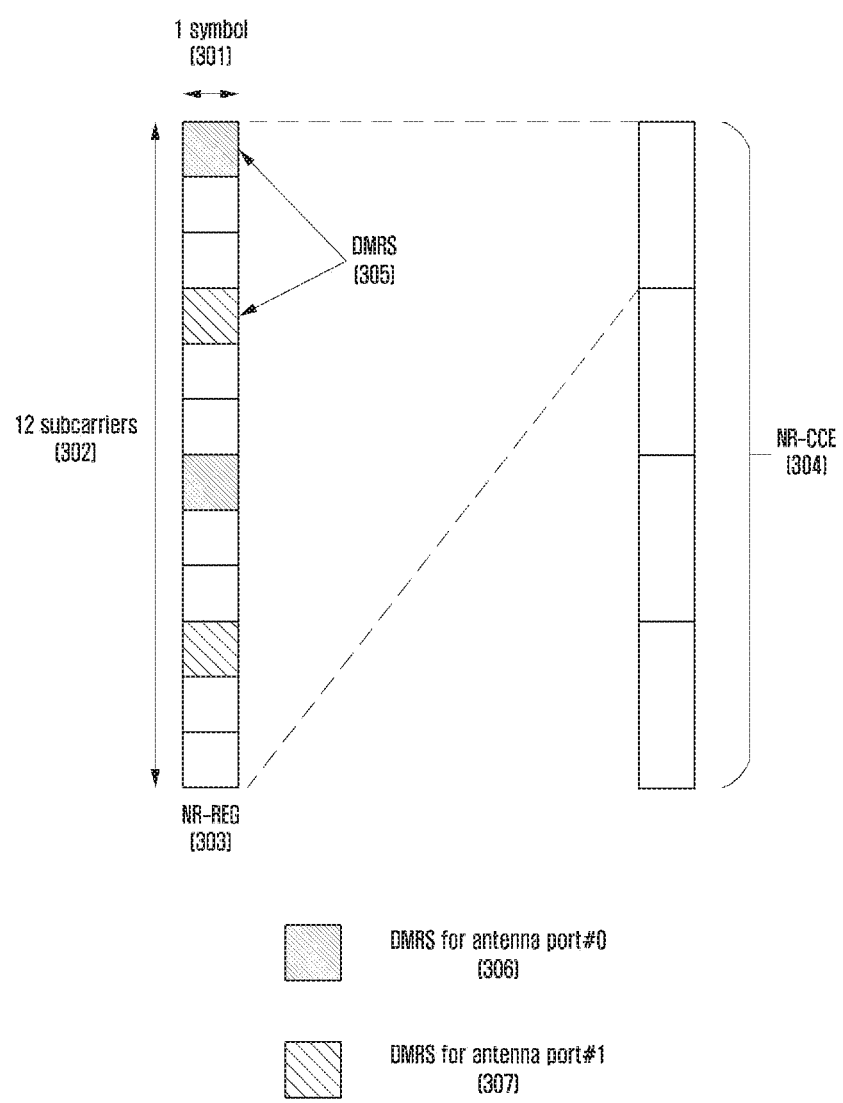
FIG. 3 is a diagram of the downlink control channel.

FIG. 3 is a diagram of a basic unit of time and frequency resources configuring the downlink control channel that can be used in 5G. Referring to FIG. 3, in the basic units (the basic units may be named REG, new radio (NR)-REG, etc.). Hereinafter, the basic units are named the NR-REG 303 of the time and frequency resources configuring the control channel and one OFDM symbol 301 is configured on a time axis and 12 subcarriers 302 (e.g., 1RB is configured on a frequency axis). The data channel and the control channel may be time multiplexed within one subframe by assuming that the basic unit on the time axis is one OFDM symbol 301 in configuring the basic unit of the control channel. By placing the control channel ahead of the data channel, it is possible to reduce the processing time of the user and it is easy to satisfy the delay time requirement. By setting the basic unit of the frequency axis of the control channel to the 1 RB 302, it is possible to more efficiently perform the frequency multiplexing between the control channel and the data channel.

By concatenating the basic units of the NR-REG 303 illustrated in FIG. 3, it is possible to set the control channel areas having various sizes. For example, if the basic unit in which the downlink control channel is allocated in the 5G is an NR-CCE 304, 1 NR-CCE 304 may be configured as a plurality of NR-REGs 303. If the NR-REG 303 may consist of 12 REs, and the 1 NR-CCE 304 may consist of 4 NR-REGs 303, the 1 NR-CCE 304 may consist of 48 REs. If the downlink control resource set is configured, the corresponding area may include a plurality of NR-CCEs 304. The specific downlink control channel may be mapped to one or a plurality of NR-CCEs 304 according to the AL within the control resource set and transmitted. The NR-CCEs 304 in the control resource set are identified by number and the number may be given according to a logical mapping scheme.

The basic unit of the downlink control channel shown in FIG. 3. The NR-REG 303 may include all the areas in which the REs to which the DCI is mapped and the DMRSs 305 as a reference signal for decoding the REs are mapped to each other. The DMRS 305 may be efficiently transmitted considering the overhead due to the RS allocation. For example, when the downlink control channel is transmitted using a plurality of OFDM symbols, the DMRS 305 may be transmitted to only the first OFDM symbol. The DMRSs 305 may be transmitted by being mapped to each other in consideration of the number of antenna ports used to transmit the downlink control channel. FIG. 3 shows an example in which two antenna ports are used. There may be a DMRS 306 transmitted for antenna port #0 and a DMRS 307 transmitted for antenna port #1. The DMRS for different antenna ports can be multiplexed in various ways. FIG. 3 shows an example in which the DMRSs corresponding to different antenna ports are transmitted by being orthogonal to each other in different REs. As such, the DMRSs may be transmitted by being FDMed or transmitted by being CDMed. In addition, there may also be various types of DMRS patterns, which may be associated with the number of antenna ports. Hereinafter, it is assumed that two antenna ports are used in describing the disclosure. The same principle in the disclosure can be applied to two or more antenna ports.

Figure 4:
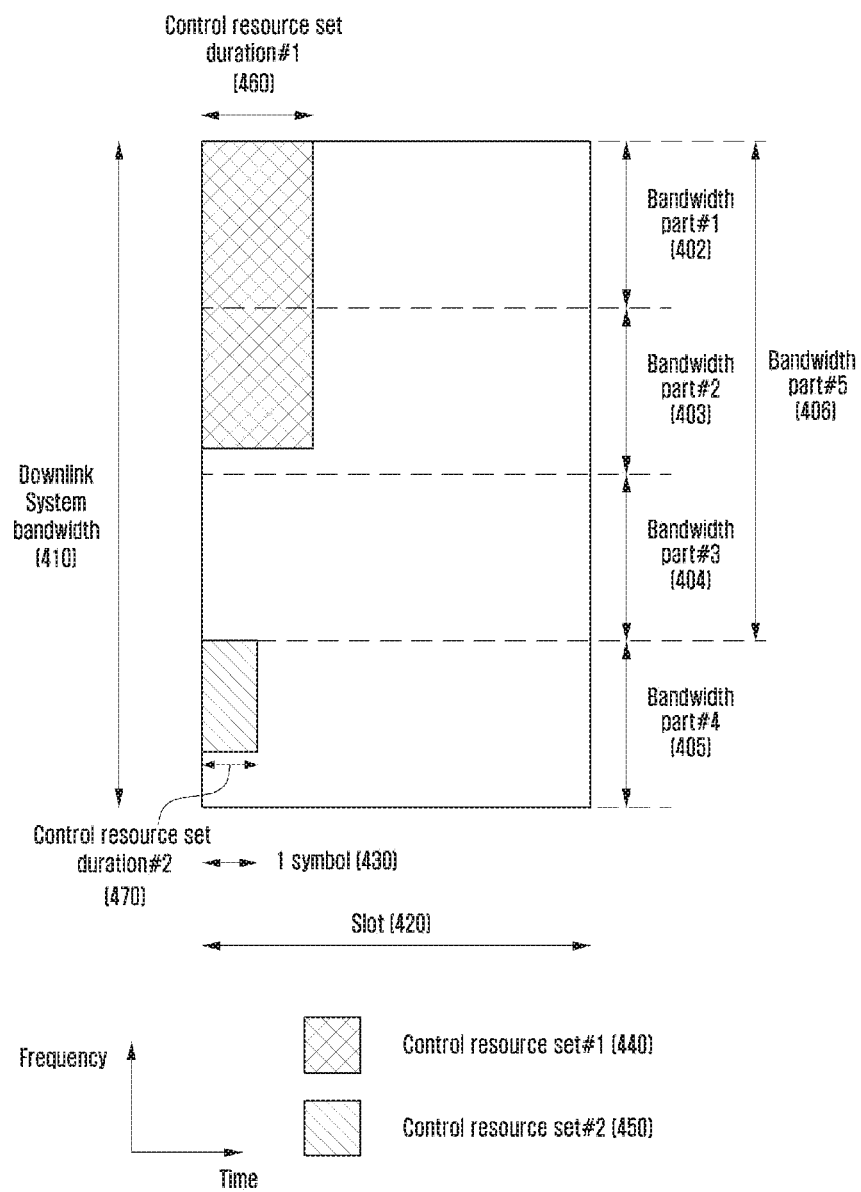
FIG. 4 is a diagram of a resource area allocation method for a 5G downlink control channel.

FIG. 4 is a diagram of a control resource set in which the downlink control channel is transmitted in a 5G wireless communication system. In FIG. 4, a system bandwidth 410 is shown on a frequency axis and a resource region which is 1 slot 420 is shown on a time axis. In one example of FIG. 4, one slot is assumed to be 7 OFDM symbols, but the case in which one slot is assumed to be 14 symbols can also be applied. In FIG. 4, the overall system bandwidth 410 may include one bandwidth part or a plurality of bandwidth parts (e.g., four bandwidth parts of bandwidth part #1 402, bandwidth part #2 403, bandwidth part #3 404, and bandwidth part #4 405). A bandwidth part including at least one bandwidth part such as bandwidth part #5 406 can also be configured. FIG. 4 shows an example in which two control resource sets (control resource set #1 440, control resource set #2 450) are configured. The control resource sets 440 and 450 may be configured to be specific subbands within the overall system bandwidth 410 on the frequency axis. In FIG. 4, the control resource set #1 440 is configured over the bandwidth part #1 402 and the bandwidth part #2 403, and the control resource set #2 450 is configured over the bandwidth part #4 405. One or a plurality of OFDM symbols may be configured on the time axis, which may be defined as control resource set durations 460 and 470. In one example of FIG. 4, the control resource set #1 440 is configured to be the control resource set duration #1 460 of 2 symbols and the control resource set #2 450 is configured to be the control resource set duration #2 470 of 1 symbol.

In the 5G communication system, a plurality of control resource sets may be configured in one system from the viewpoint of the base station. In addition, a plurality of control resource sets may be configured in one terminal from the viewpoint of the terminal. Some of the configured control resource sets in the system can be configured in the terminal. Therefore, the terminal may not know whether or not the terminal exists in a specific control resource set existing in the system. In FIG. 4, two control resource sets of the control resource set #1 440 and the control resource set #2 450 may be configured in the system, the control resource set #1 440 may be configured in terminal #1, and the control resource set #1 440 and the control resource set #2 450 may be configured in the terminal #2. If there is no additional indicator, the terminal #1 may not know whether or not the control resource set #2 450 exists.

The control resource set in the above-described 5G may be configured as a common control resource set, configured as UE-group common, or configured as UE-specific. The control resource set may be configured in each terminal through UE-specific signaling, UE-group common signaling, or RRC signaling. Configuring the control resource set in the terminal means providing information on the position of the control resource set, the sub-band, the resource allocation of the control resource set, the control resource set duration and the like. For example, the configuring the control resource set may include the following information.

TABLE 1

Configuration information 1. RB allocation information on frequency axis
Configuration information 2. Control resource set duration (The number of OFDM symbols configured as control resource set) on time axis
Configuration information 3. Resource mapping scheme (time-first mapping, frequency-first mapping)
Configuration information 4. Transmission mode (localized transmission scheme, distributed transmission scheme)
Configuration information 5. Search space type (common search space, UE-group search space, UE-specific search space)
Configuration information 6. Monitoring occasion (monitoring period/interval, monitoring symbol position within slot)
Configuration information 7. DMRS configuration information (DMRS structure, the number of DMRS ports)
Configuration information 8. REG bundling size In addition to the above configuration information, various types of information necessary for transmitting the downlink control channel may be configured in the terminal.

Figure 5:
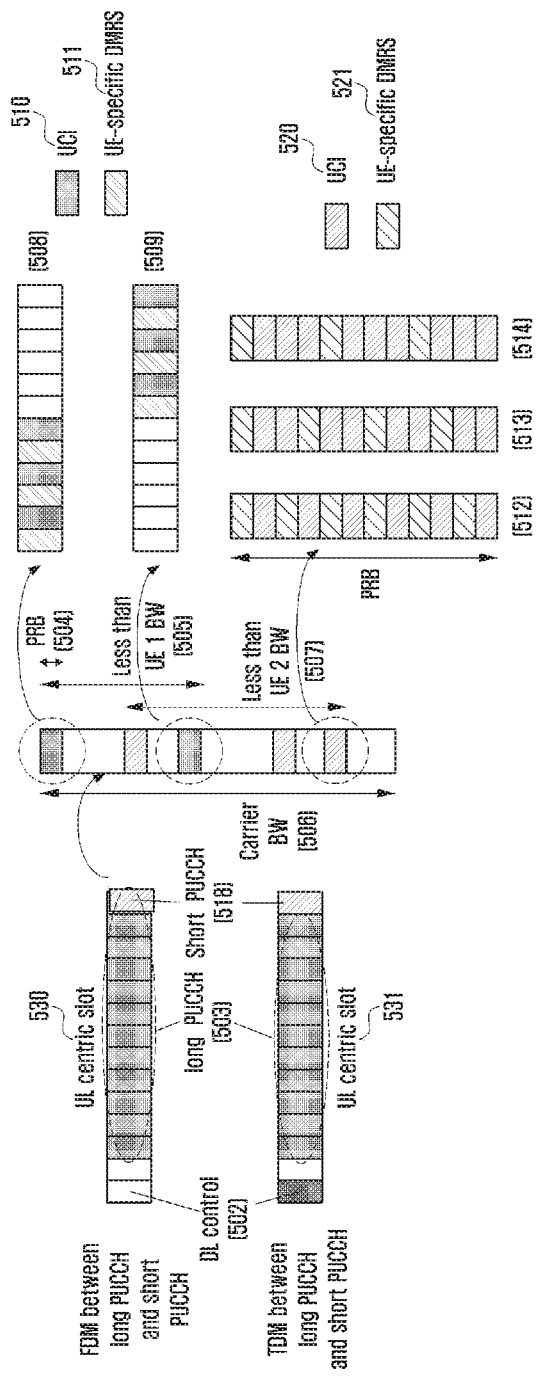
FIG. 5 is a diagram of a resource area allocation method for a 5G uplink control channel.

FIG. 5 is a diagram of a structure of the PUCCH in the 5G wireless communication system. FIG. 5 illustrates a method of transmitting, by a terminal, an uplink control channel by determining a transmission interval (or positions of a starting symbol and an end symbol or the number of starting symbols and transmission symbols) of a long PUCCH based on a slot, but it may also be applied to a case of transmitting, by a terminal, an uplink control channel by determining a long PUCCH transmission section based on a minislot (or slot consisting of the number of symbols less than the number of symbols configuring a slot). An uplink control channel having a short transmission interval (e.g., an uplink control channel consisting of one or two symbols) to minimize a transmission delay is called a short PUCCH, and an uplink control channel having a long transmission interval (e.g., an uplink control channel consisting of at least four symbols) to obtain sufficient cell coverage is called long PUCCH. The short PUCCH supports two PUCCH formats of PUCCH format 0 and PUCCH format 2, and the long PUCCH supports three PUCCH formats of PUCCH format 1, PUCCH format 3, and PUCCH format 4.

In FIG. 5, the long PUCCH and the short PUCCH are multiplexed in the frequency domain (FDM, 500) or multiplexed in a time domain (TDM, 501). First, the slot structure in which the long PUCCH and the short PUCCH are multiplexed will be described with reference to FIG. 5. The basic unit of the signal transmission will be described as a slot, but it can be used in various names such as a sub-frame or a transmission time interval (TTI). Reference numerals 530 and 531 indicate an UL centric slot in which the symbol configuring the slot is mainly used as uplink. The uplink centric slot refers to a case in which most of the OFDM symbols are used in the uplink, in which all the OFDM symbols may be used for the uplink transmission, or in which a few OFDM symbols may be used for the downlink transmission. When the downlink and the uplink are simultaneously present within one slot, a transmission gap may exist between the downlink and the uplink. FIG. 5 illustrates an example in which a first OFDM symbol in one slot is used for a downlink transmission, for example, a downlink control channel transmission 502, and a third OFDM symbol to a last symbol of a slot are used for the uplink transmission. A second OFDM symbol is used as a transmission gap. In the uplink transmission, an uplink data channel transmission and an uplink control channel transmission are possible.

Next, the long PUCCH 503 will be described.

Since the control channel of the long transmission interval is used for the purpose of increasing cell coverage, the control channel may be transmitted in a DFT-S-OFDM scheme which is a single carrier transmission rather than an OFDM transmission. Therefore, only the contiguous subcarriers should be transmitted. To obtain a frequency diversity effect, the uplink control channel of the long transmission interval is configured at a spaced position like reference numerals 508 and 509. A spaced distance 505 in terms of frequency should be less than or equal to the uplink bandwidth supported by the terminal or the uplink bandwidth configured in the terminal. In a front part of the slot, as in reference numeral 508, PRB-1 is used and transmitted, and in a rear part of the slot, as in reference numeral 509, PRB-2 is used and transmitted. The PRB is a physical resource block, which means a minimum transmission unit on the frequency side and may be defined as 12 subcarriers, and the like. Therefore, the frequency side distances of the PRB-1 and the PRB-2 should be less than or equal to the maximum support bandwidth of the terminal or the uplink transmission bandwidth configured in the terminal, and the maximum support bandwidth of the terminal is less than or equal to a bandwidth 506 supported by the system. The frequency resources PRB-1 and PRB-2 may be configured in the terminal by a higher signal, the frequency resource is mapped to a bit field by the higher signal, and a bit field included in the downlink control channel may indicate to the terminal which of the frequency resources is used. In addition, the control channel transmitted in the front part of the slot 508 and the control channel transmitted in the rear part of the slot 509 each consist of uplink control information (UCI) 510 and a terminal reference signal 511. It is assumed that the two signals are temporally divided and transmitted in the OFDM symbol.

The long PUCCH supports transmission formats such as PUCCH format 1, PUCCH format 3, and PUCCH format 4 according to the number of control information bits that can be supported and whether to support terminal multiplexing through pre-DFT OCC support in a front end of IFFT.

First, the PUCCH format 1 is a long PUCCH format based on DFT-S-OFDM that can support control information of up to 2 bits. The control information may consist of a combination of HARQ-ACK and a scheduling request (SR) or each of them. The PUCCH format 1 has an OFDM symbol including DMRS as a demodulation reference signal and an OFDM symbol including control information (UCI) which are configured repeatedly. For example, when the number of transmission symbols of the PUCCH format 1 is 8 symbols, a DMRS symbol, a UCI symbol, a DMRS symbol, a UCI symbol, a DMRS symbol, a UCI symbol, a DMRS symbol, and a UCI symbol are sequentially formed from the first starting symbol of the 8 symbols. The DMRS symbol has a structure in which it is spread in a sequence corresponding to a length of 1 RB on the frequency axis within one OFDM symbol using an orthogonal code (or orthogonal sequence, w_i (m)) on the time axis, and is transmitted after being subjected to an inverse fast Fourier transform (IFFT). The UCI symbol has a structure in which it generates d(0) by modulating 1-bit control information by BPSK and 2-bit control information by QPSK, scrambles the generated d(0) by multiplying the generated d(0) by a sequence corresponding to a length of 1 RB on the frequency axis, spreads the scrambled sequence using the orthogonal code (or orthogonal sequence, w_i (m)) on the time axis, and is transmitted after being subjected to IFFT. The terminal generates a sequence based on group hopping or sequence hopping configuration that is configured as the higher signal from the base station and the configured ID, and cyclically shift the generated sequence with an indicated initial cyclic shift (CS) value to generate a sequence corresponding to a length of 1 RB.

Next, the PUCCH format 3 is a long PUCCH format based on DFT-S-OFDM that can support control information more than 2 bits. The control information may consist of a combination of HARQ-ACK, channel state information (CSI) and the SR or each of them. The DMRS symbol position in PUCCH format 3 is shown in the following Table 2 according to whether the frequency hopping is performed and whether additional DMRS symbols are configured.

TABLE 2

| | DMRS position within PUCCH format 3/4 transmission | | | |
|---|---|---|---|---|
| | No additional DMRS configuration | | Additional DMRS configuration | |
| PUCCH format 3/4 transmission duration | No frequency hopping configuration | Frequency hopping configuration | No frequency hopping configuration | Frequency hopping configuration |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, when the number of transmission symbols of PUCCH format 3 is 8 symbols, the first starting symbol of 8 symbols starts with 0, and the DMRS is transmitted to the first symbol and the fifth symbol. Table 2 is also applied to the DMRS symbol position of PUCCH format 4 in the same manner.

Next, the PUCCH format 4 is a long PUCCH format based on DFT-S-OFDM that can support control information more than 2 bits. The control information may consist of a combination of HARQ-ACK, CSI and the SR or each of them. The PUCCH format 4 differs from the PUCCH format 3 in that the PUCCH format 4 of a plurality of terminals can be multiplexed within one RB. It is possible to multiplex the PUCCH format 4 of a plurality of terminals by applying pre-DFT OCC to the control information at the front end of the IFFT. However, the number of control information symbols that can be transmitted from one terminal decreases according to the number of terminals to be multiplexed.

Next, a short PUCCH 518 will be described.

The short PUCCH may be transmitted in both the downlink centric slot and the uplink centric slot and is generally transmitted in the last symbol of the slot or in the OFDM symbol (e.g., the last OFDM symbol, the second OFDM symbol to last, or the last two OFDM symbols) at the rear part. The short PUCCH may be transmitted at an arbitrary position in the slot. The short PUCCH may be transmitted using one OFDM symbol or two OFDM symbols. FIG. 5 shows that the short PUCCH is transmitted in the last symbol 518 of the slot. Radio resources for the short PUCCH are allocated in units of PRB on the frequency side. As the allocated PRBs, one PRB or a plurality of PRBs may be allocated, or a plurality of PRBs away from the frequency band may also be allocated. The allocated PRB should be included in the frequency band 507 supported by the terminal or a band less than or equal to the uplink transmission bandwidth configured in the terminal by the base station. The plurality of PRBs which are the allocated frequency resources may be configured in the terminal by a higher signal, the frequency resource is mapped to a bit field by the higher signal, and a bit field included in the downlink control channel may indicate to the terminal which of the frequency resources is used. The uplink control information 520 and the demodulation reference signal 521 should be multiplexed in the frequency band within one PRB. As in 512, there may be a method for transmitting a demodulation reference signal to one subcarrier every two subcarriers, and the DMRS mapping scheme is defined in the specification, and the terminal transmits a short PUCCH according to the mapping scheme, and the base station demodulates the short PUCCH according to the mapping scheme. The case of 512 is an example, and the demodulation reference signal may be transmitted at different intervals such as 513 and 514

The short PUCCH supports the transmission formats such as the PUCCH format 0 and the PUCCH format 2 according to the number of control information bits that can be supported. First, the PUCCH format 0 is the short PUCCH format based on the CP-OFDM that can support control information of up to 2 bits. The control information may consist of a combination of the HARQ-ACK and the SR or each of them. The PUCCH format 0 has a structure which does not transmit DMRS but transmits only a sequence mapped to 12 subcarriers on the frequency axis within one OFDM symbol. The terminal generates the sequence based on the group hopping or sequence hopping configuration that is configured as the higher signal from the base station and the configured ID and cyclically shifts the generated sequence based on a final CS value obtained by adding other CS values to the indicated initial CS value according to ACK or NACK to be mapped to 12 subcarriers so as to transmit the generated sequence. For example, if the HARQ-ACK is 1 bit, as shown in the following Table 3, with the ACK, the final CS is generated by adding 6 to the initial CS value, and with the NACK, the final CS is generated by adding 0 to the initial CS. 0 which is the CS value for the NACK and 6 which is the CS value for the ACK are defined in the specification, and the terminal generates the PUCCH format 0 according to the value all the times to transmit the 1-bit HARQ-ACK.

TABLE 3

| 1-bt HARQ-ACK | NACK | ACK |
|---|---|---|
| Final CS | (initial CS + 0) mod 12 = initial CS | (initial CS + 6) mod 12 |

If the HARQ-ACK is 2 bits, as in Table 4 below, in the case of (NACK, NACK), 0 is added to the initial CS value, in the case of (NACK, ACK), 3 is added to the initial CS value, in the case of (ACK, ACK), 6 is added to the initial CS value, and in the case of (ACK, NACK), 9 is added to the initial CS value. 0 which is the CS value for the (NACK, NACK), 3 which is the CS value for the (NACK, ACK), 6 which is the CS value for the (ACK, ACK), and 9 which is the CS value for the (ACK, NACK) are defined, and the terminal always generates the PUCCH format 0 according to the value and transmits the 2-bit HARQ-ACK.

If the final CS value exceeds 12 due to the CS value added according to the ACK or NACK in the initial CS value, it is obvious that the length of the sequence is 12, and therefore the mod 12 is applied.

TABLE 4

| | 2-bit HARQ-ACK | | | |
|---|---|---|---|---|
| | NACK, NACK | NACK, ACK | ACK, ACK | ACK, NACK |
| Final CS | (initial CS + 0) mod 12 = initial CS | (initial CS + 3) mod 12 | (initial CS + 6) mod 12 | (initial CS + 9) mod 12 |

Next, the PUCCH format 2 is the short PUCCH format based on the CP-OFDM that can support control information more than 2 bits. The control information may consist of a combination of the HARQ-ACK, the CSI, and the SR or each of them. The PUCCH format 2 indicates that as in 512, the position of the subcarrier to which the DMRS is transmitted in one OFDM symbol is fixed to subcarriers having indexes of #1, #4, #7, and #10 when the index of the first subcarrier is #0. The control information is mapped to the remaining subcarriers excluding the subcarriers in which the DMRS is located by being subjected to the channel encoding and then subjected to the modulation process.

The terminal configures the PUCCH resource sets as the higher signal. The terminal selects the configured PUCCH resource sets according to the number of control information bits. In a specific slot, the terminal selects PUCCH resource set 0 when the number of control information bits to be transmitted is 1 and 2, selects PUCCH resource set 1 when the number of control information bits to be transmitted is 3 to $N_2-1$, selects PUCCH resource set 2 when the number of control information bits to be transmitted is $N_2$ to $N_3-1$, and selects PUCCH resource set 3 when the number of control information bits to be transmitted is $N_3$ to $N_4-1$. The $N_2$, $N_3$, and $N_4$ are all higher signals, and the terminal can receive the signals from the base station in advance.

Each PUCCH resource set includes X PUCCH resources, and X PUCCH resources include resources for the short PUCCHs (PUCCH format 0, PUCCH format 2) or resources for the long PUCCH (PUCCH format 1, PUCCH format 3, PUCCH format 4). Which of the X resources the terminal selects and whether to transmit the PUCCH format corresponding to the selected resource may be indicated through bits of the downlink control channel and may be induced through transmission resources or slot indexes of the downlink control channel, a unique ID of the terminal and the like. Alternatively, the indication method through the downlink control channel and the induction method through the transmission resource or slot index of the downlink control channel, the unique identifier of the terminal and the like may be combined to be indicated to the terminal. The terminal receives or induces the indication scheme to select one PUCCH resource from the X PUCCH resources and transmit the control information through the corresponding PUCCH format.

The PUCCH resource indication scheme can be applied only when the terminal can determine the PUCCH resource through the corresponding downlink control channel reception before the HARQ-ACK transmission. If the terminal does not receive the corresponding downlink control channel reception before the CSI or SR like the CSI or SR transmission, the terminal in advance receives the PUCCH format to be used at the time of the CSI or SR transmission and the required PUCCH resource through the higher signal from the base station, and in the slot for the CSI or SR transmission according to the period and offset configured by the higher signal from the base station, the terminal uses the configured PUCCH format in the configured PUCCH resource to transmit the CSI or SR.

The PUCCH resource corresponding to the PUCCH format includes at least one of the following information.

(1) PUCCH transmission starting symbol, the number of PUCCH transmission symbols;

(2) Index indicating the start PRB, the number of transmission PRBs, the frequency hopping configuration, the frequency resources of the second hop when the frequency hopping is indicated; and/or (3) Initial CS value, index of time axis orthogonal cover code (OCC), length of Pre-DFT OCC, index of Pre-DFT OCC The required information and the value range is summarized by Table 5 according to the respective PUCCH formats. If the values do not need to be set in the following Table 5 or are 1 and therefore the value range is not required, the values are marked by N.A.

TABLE 5

| | | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
| | Value range | 0-13 | 0-10 | 0-13 | 0-10 | 0-10 |
| Number of symbols in a slot | Configurability | ✓ | ✓ | ✓ | ✓ | ✓ |
| | Value range | 1, 2 | 4-14 | 1, 2 | 4-14 | 4-14 |
| Index for identifying starting PRB | Configurability | ✓ | ✓ | ✓ | ✓ | ✓ |
| | Value range | 0-274 | 0-274 | 0-274 | 0-274 | 0-274 |
| Number of PRBs | Configurability | N.A. | N.A. | ✓ | ✓ | N.A. |
| | Value range | N.A. (Default is 1) | N.A. (Default is 1) | 1-16 | 1-6, 8-10, 12, 15, 16 | N.A. (Default is 1) |
| Enabling a FH | Configurability | ✓ | ✓ | ✓ | ✓ | ✓ |
| | Value range | On/Off (only for 2 symbol) | On/Off | On/Off (only for 2 symbol) | On/Off | On/Off |
| Freq.cy resource of $2^{nd}$ hop if FH is enabled | Configurability | ✓ | ✓ | ✓ | ✓ | ✓ |
| | Value range | 0-274 | 0-274 | 0-274 | 0-274 | 0-274 |
| Index of initial cyclic shift | Configurability | ✓ | ✓ | N.A. | N.A. | N.A. |
| | Value range | 0-11 | 0-11 | N.A. | 0-11 | 0-11 |
| Index of time-domain OCC | Configurability | N.A. | ✓ | N.A. | N.A. | N.A. |
| | Value range | N.A. | 0-6 | N.A. | N.A. | N.A. |

TABLE 5-continued

|  |  | PUCCH Format 0 | PUCCH Format 1 | PUCCH Format 2 | PUCCH Format 3 | PUCCH Format 4 |
| --- | --- | --- | --- | --- | --- | --- |
| Length of Pre-DFT OCC | Configurability | N.A. | N.A. | N.A. | N.A. | ✓ |
|  | Value range | N.A. | N.A. | N.A. | N.A. | 2, 4 |
| Index of Pre-DFT OCC | Configurability | N.A. | N.A. | N.A. | N.A. | ✓ |
|  | Value range | N.A. | N.A. | N.A. | N.A. | 0, 1, 2, 3 |

Hereinafter, with the short PUCCH, it is referred to as the PUCCH format 0 or the PUCCH format 2 unless specified, and with the long PUCCH, it is referred to as the PUCCH format 1, the PUCCH format 3, or the PUCCH format 4 unless specifically specified. In addition, the transmission by the PUCCH format X refers to the transmission by the PUCCH resource for the PUCCH format X obtained by the method of the disclosure such as the indication, the induction and the like from the base station unless specifically specified.

It may be determined whether one terminal transmits the uplink control information using the long PUCCH or transmits the uplink control information using the short PUCCH in a slot or a minislot based on the use information of the long PUCCH or the short PUCCH included in a higher layer signal by receiving the higher layer signal from the base station. Alternatively, it may be determined whether one terminal transmits the uplink control information using the long PUCCH or transmits the uplink control information using the short PUCCH in a slot or a minislot based on the use information of the long PUCCH or the short PUCCH included in a physical signal by receiving the physical signal from the base station. It may be implicitly determined whether one terminal transmits the uplink control information using the long PUCCH or transmits the uplink control information using the short PUCCH in a slot or a minislot based on the number of uplink symbols in the slot or the minislot. For example, when the number of uplink symbols in the slot or the minislot indicated or configured from the base station is 1 or 2 to transmit the uplink control information, the uplink control information may be transmitted using the short PUCCH, and when the number of uplink symbols in the slot or the minislot is 4 to 14, the uplink control information may be transmitted using the long PUCCH.

It may be determined whether one terminal transmits the uplink control information using the long PUCCH or transmits the uplink control information using the short PUCCH in the slot or the minislot in conjunction with the information indicating a waveform of msg3 included in msg2 while the terminal performs the random access. That is, when the information indicating the waveform of the msg3 included in the msg2 is the CP-OFDM, the terminal transmits the uplink control information through the short PUCCH using the waveform of the CP-OFDM. When the information indicating the waveform of the msg3 included in the msg2 is the DFT-S-OFDM, the terminal transmits the uplink control information through the long PUCCH using the waveform of the DFT-S-OFDM.

Next, it is described how the long PUCCH and the short PUCCH described above are multiplexed. In one slot 530, long PUCCH and short PUCCH of different terminals may be multiplexed in the frequency domain (500). The base station can be configured so that the short PUCCH and the long PUCCH frequency resources of different terminals not to overlap as in the PRB of FIG. 5. However, configuring the transmission resources of the uplink control channels of all terminals differently regardless of scheduling is frequency waste, and it is not appropriate to limit the frequency resources when considering that the limited frequency resources should be used for uplink data channel transmission rather than the uplink control channel transmission. Therefore, the frequency resources of the short PUCCH and the long PUCCH of different terminals may overlap, and the base station should be operated so that the scheduling and the transmission resources of different terminals do not collide with each other in one slot.

When the short PUCCH transmission resource and the long PUCCH transmission resource of different terminals cannot be avoided colliding in a specific slot, the base station needs a scheme to prevent the transmission resources of the long PUCCH from colliding with the transmission resource of the short PUCCH, and the terminal needs to adapt the transmission resource of the long PUCCH according to the indication of the base station. By the scheme, the transmission resources of the short PUCCH and the long PUCCH can be multiplexed in a time domain within one slot 531.

As described above, when the terminal is configured to divide the downlink and uplink bandwidths into one or more bandwidth parts, respectively, configuration methods such as a method for configuring, by a terminal, an uplink control channel resource in consideration of a bandwidth part, a method for selecting an uplink control channel resource, and a method for changing a bandwidth part are required.

First Embodiment

Figure 6:
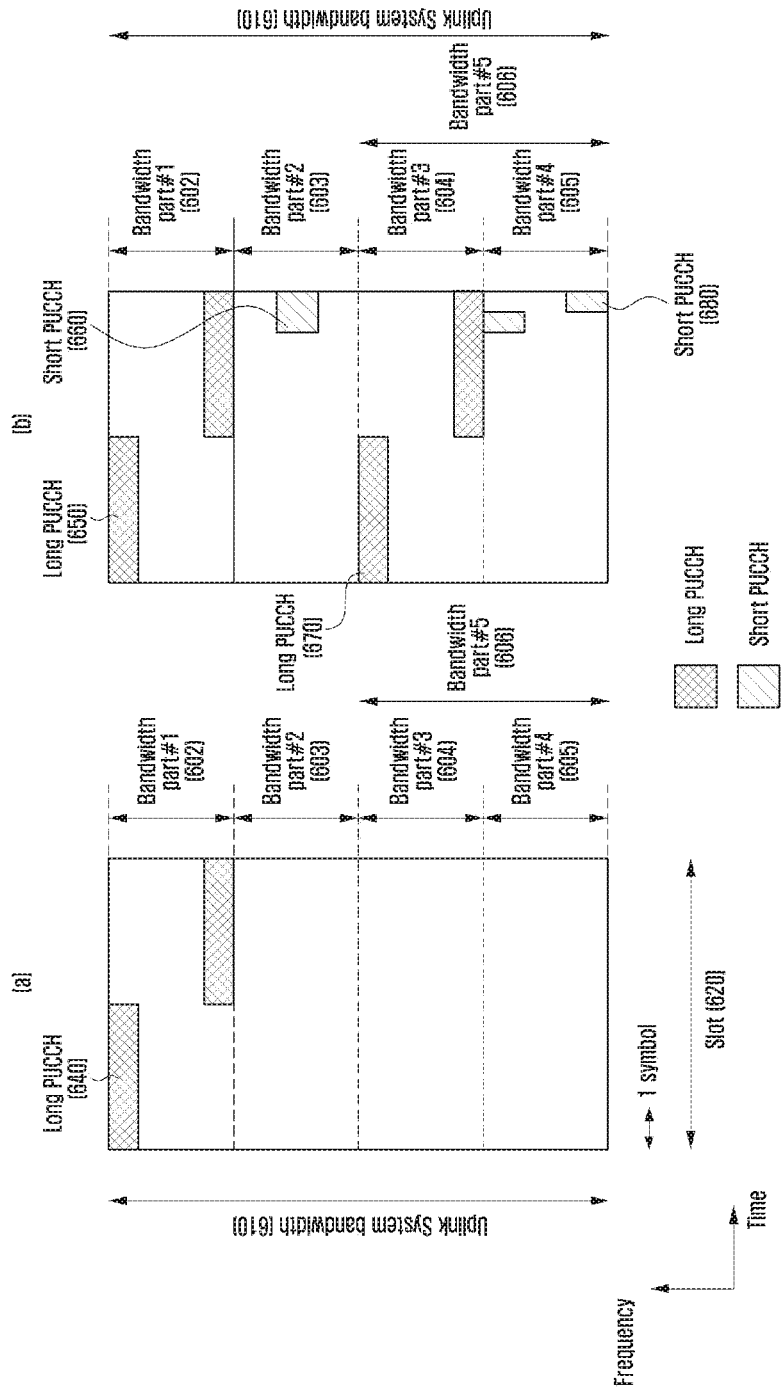
FIG. 6 is a diagram of a 5G bandwidth partial configuration and an uplink control channel resource configuration.

FIG. 6 is a diagram of a 5G bandwidth partial configuration and an uplink control channel resource configuration, according to an embodiment. In FIG. 6, an uplink system bandwidth 610 is shown on a frequency axis and 1 slot 620 is shown on a time axis. In FIG. 6, one slot is assumed to be 7 OFDM symbols, but it can also be applied to a case in which one slot is assumed to be 14 symbols. In FIG. 6, the uplink system bandwidth 610 may include a plurality of uplink bandwidth parts (e.g., four bandwidth parts of bandwidth part #1 602, bandwidth part #2 603, bandwidth part #3 604, and bandwidth part #4 605). A bandwidth part including at least one bandwidth part such as bandwidth part #5 (606) can also be configured. In addition, the terminal can activate and use only one or a plurality of bandwidth part s at a specific time (symbol or slot, subframe, or frame). Activation and deactivation of the bandwidth part may be performed through at least one of a higher signal, DCI information transmitted through the downlink control channel, a MAC CE, a bandwidth partial activation and deactivation timer.

All the uplink control channel transmission resources may be configured in the bandwidth part, or the uplink control channel transmission resources may be configured only in one or a part of the bandwidth part. The uplink control channel transmission resource described above may be configured in each terminal through the UE-specific signaling, the UE-group common signaling, the RRC signaling, and the like. Configuring the uplink control channel transmission resource in the terminal means providing the information such as the location of the control channel transmission region, the sub-band, the resource allocation of the control channel, and the length of the control channel. For example, the uplink control channel transmission resource set may include the following information.

TABLE 6

Configuration information 1. RB allocation information on frequency axis of uplink control channel;
Configuration information 2. Allocation information (starting symbol location of control channel) on time axis of uplink control channel;
Configuration information 3. Time axis length (the number of OFDM symbols of control channel) of uplink control channel or format;
Configuration information 4. Waveform (OFDM or DFT-S-OFDM) of uplink channel;
Configuration information 5. Frequency hopping mode of uplink control cannel As shown in FIG. 6A, the terminal allocated one or more bandwidth parts may be allocated one or more uplink control channel transmission resources 640 in one of the configured bandwidth parts. The terminal may be configured with one or more uplink control channel transmission resources 650, 660, 670, and 680 in all the bandwidth parts configured as shown in FIG. 6B. The terminal may receive the uplink control channel transmission resources only in some of the configured bandwidth parts. The uplink control channel transmission resource configuration may be independent for each bandwidth part. The base station may configure the uplink control channel transmission resource based on the maximum uplink frequency bandwidth which can be supported by the terminal without considering the bandwidth part at the time of configuring the uplink control channel transmission resource. The base station may configure uplink control channel transmission resources 650 and 680 based on the maximum uplink frequency bandwidth 610 of the terminal. In Considering the uplink control channel transmission resource and the uplink bandwidth part configured from the base station, the terminal determines that a long PUCCH uplink control channel 650 and a short PUCCH uplink control channel 680 are configured in bandwidth part #1 602 and bandwidth part #4 605 and a separate uplink control channel is not configured in bandwidth part #2 603 and bandwidth part #3 604.

In addition, it is assumed that the uplink control channel is not configured in each bandwidth part or one uplink control channel is configured. However, when one or more uplink control channels are configured in the bandwidth part is also possible. At least one of the configuration information related to the uplink control channel as shown in Table 6 may be defined in advance between the base station and the terminal, may be configured by the terminal from the base station through the higher signal, or may be configured based on the system information (e.g., a signal transmitted to SI-RNTI). The base station may transmit the higher signal by including the configuration information in the transmitted higher signal so as to configure the uplink bandwidth part in the terminal. If the maximum uplink bandwidth that can be supported by the terminal or a plurality of uplink control channel transmission resources is configured in the at least one bandwidth part, the base station may select one of the plurality of control channel transmission resources (or uplink control channel configuration index or uplink control channel format) and may transmit the selected control channel transmission resource information to the terminal through the downlink control channel. In other words, the terminal may receive the DCI transmitted through the downlink control channel to receive the downlink data channel according to the DCI, and may output the reception result of the downlink data received through the downlink data channel and report or transmit to the base station using the control channel transmission resource indicated by the DCI.

When the terminal requires the uplink signal transmission through the uplink control channel, the terminal may activate the bandwidth part (e.g., at least one (bandwidth part #1 602) of the deactivated bandwidth parts when there is no uplink control channel resource configured in the bandwidth part #2 603) to transmit the uplink control channel. If the terminal can activate only one uplink bandwidth part, it may be determined that the bandwidth part (bandwidth part #2 603) which is currently activated but has no uplink control channel resource configured in the bandwidth part is deactivated and only the bandwidth part (bandwidth part #1 602) activated to allow the terminal to transmit the uplink control channel is activated. After transmitting the uplink control channel, the terminal may activate the bandwidth part #2 603 and deactivate the bandwidth part #1 602 again. In a symbol or slot that activates the bandwidth part #1 602 for the uplink control channel transmission, when the uplink signal (for example, SRS) transmission is configured in the bandwidth part #2 603 or another bandwidth part (for example, the bandwidth part #3 604), all the uplink signal transmissions may not be performed in other bandwidth parts other than the bandwidth part #1 602 activated for the uplink control channel transmission. When the time that the terminal transmits the uplink control channel in the bandwidth part #1 602 and the time (e.g., symbols) between the uplink signal transmissions configured in the bandwidth part #3 604 do not overlap each other or when the uplink control channel is transmitted in the bandwidth part #1 602 and then is changed to the bandwidth part #3 604 to transmit the configured uplink signal. In other words, when the uplink control channel is transmitted in the bandwidth part #1 602 and then the uplink signal transmission of the bandwidth part #3 604 is performed at the time (symbol or slot) after the X time, the terminal may transmit the uplink control channel in the bandwidth part #1 602 and then activate the bandwidth part #3 604 to transmit the uplink signal configured in the bandwidth part #3 604.

If the terminal needs to transmit the uplink signal through the uplink control channel, when the uplink control channel resource is configured in the plurality of bandwidth parts among the bandwidth parts in which there is no uplink control channel resource which is configured in the currently activated bandwidth part but are deactivated or when the plurality of bandwidth parts are activated or the uplink control channel resource is configured in the overall bandwidth part activated all the time or the plurality of bandwidth parts will be described. The terminal may transmit the uplink control channel through the uplink control channel resource configured in a predefined or configured bandwidth part, transmit the uplink control channel through the uplink control channel resource configured in the bandwidth part having the lowest bandwidth index part among the activated bandwidth parts in which the uplink control channel resource is configured, transmit the uplink control channel through the uplink control channel resource configured in an uplink bandwidth part associated with the downlink bandwidth part receiving the downlink data channel among the activated bandwidth parts in which the uplink control channel resource is configured, transmit the uplink control channel through the uplink control channel or the uplink data channel configured in the uplink bandwidth part in which uplink signal transmission other than the uplink control channel is configured, transmit the uplink control channel through the uplink control channel configured in the most recently activated uplink bandwidth part, or transmit the uplink control channel through the uplink control channel configured in the uplink bandwidth part in which the resource for the SR that is to be performed by the terminal is configured when the scheduling request information is included in the uplink control channel transmission.

Second Embodiment

Hereinafter, a method of performing bandwidth control in the 5G communication system which is currently being discussed will be described in detail.

Figure 7:
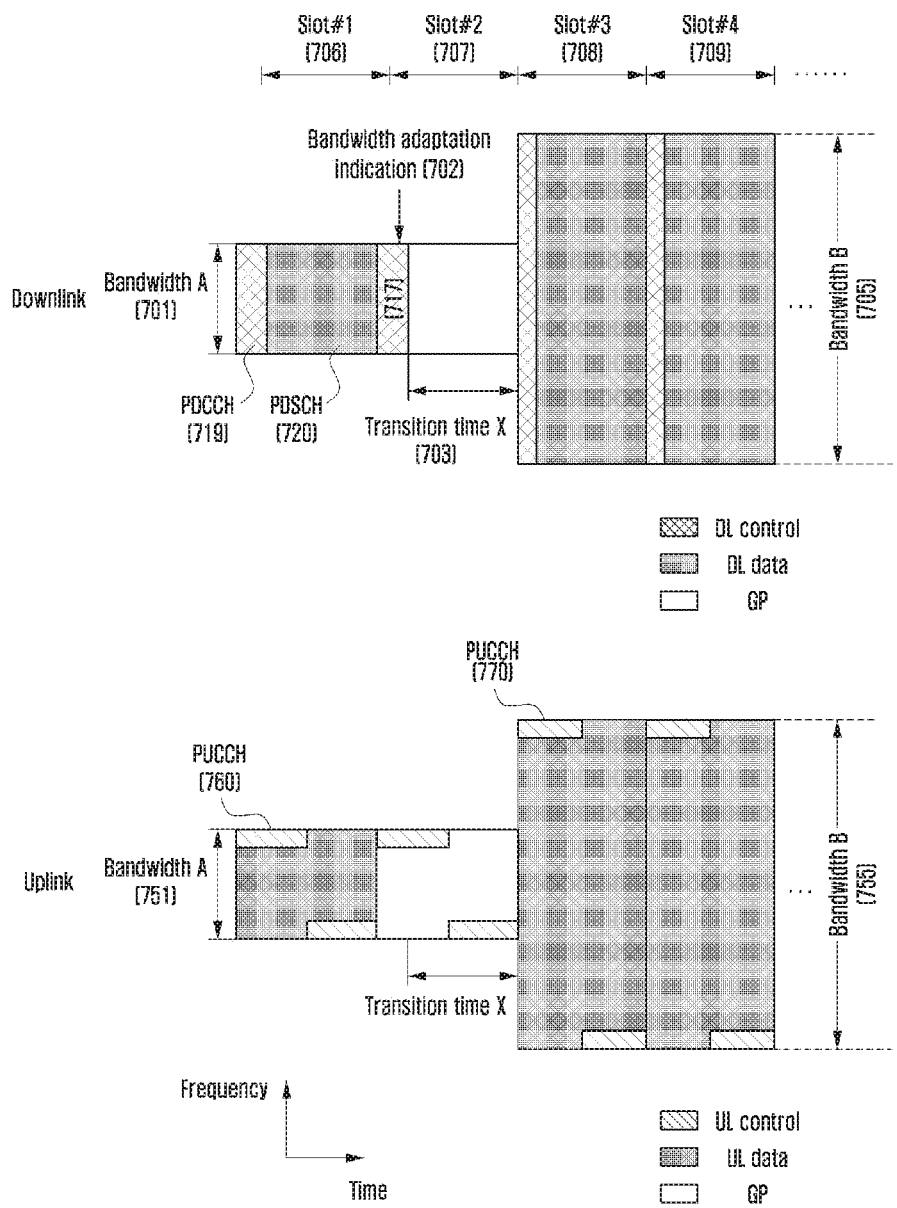
FIG. 7 is a diagram of an operation of adapting a transmission/reception bandwidth, according to an embodiment.

FIG. 7 is a diagram of an operation of adapting a transmission/reception bandwidth, according to an embodiment. The power consumption of the terminal may be efficiently managed through the bandwidth control. In FIG. 7, an abscissa represents a time domain and an ordinate represents a frequency domain. Describing the operation of adapting the downlink bandwidth of FIG. 7, it is shown that the terminal receives the downlink control channel and the downlink data channel corresponding to 'bandwidth A' 701 from the base station in a slot #1 706 interval. The bandwidth A may be a predetermined reference bandwidth, a bandwidth determined at the time of the initial connection of the terminal, or a bandwidth or bandwidth part determined through the configuration between the terminal and the base station.

If the base station instructs the terminal to change the bandwidth of the terminal to 'bandwidth B 705' through the 'bandwidth adaptation command 702' in slot #2 707, the terminal acquires the command and then performs a bandwidth change operation. The 'bandwidth A' and the 'bandwidth B' may have different sizes and the 'bandwidth A' may be larger or smaller than the 'bandwidth B'. In FIG. 7, it is assumed that the 'bandwidth B' is larger than the 'bandwidth A'. The 'bandwidth A' and the 'bandwidth B' can each be expressed in units of PRB or units of bandwidth part. The terminal needs a predetermined time to successfully receive the bandwidth adaptation command and acquire the received bandwidth adaptation command through decoding, and needs a predetermined time to change the configuration of the terminal RF module at the time of the change of the bandwidth. In FIG. 7, it is illustrated that a maximum 'bandwidth change time X' 703 is required until the terminal completes the bandwidth change by receiving the 'bandwidth adaptation command'. In FIG. 7, it is illustrated that the 'bandwidth adaptation command 702' is transmitted to the terminal by being included in a downlink control channel 717. The scenario when the downlink signal reception or the uplink signal transmission of the terminal does not occur during a reference number 703 time period is shown.

The terminal completes the bandwidth change to the 'bandwidth B' within the 'bandwidth change time X' and operates in the 'bandwidth B' from slot #3 708 period. Therefore, the base station may transmit a signal corresponding to the 'bandwidth B' to the terminal from the slot #3 708 period. The base station indicates, to the terminal, that the downlink control channel and the downlink data channel corresponding to 'bandwidth B' in slot #3 708 and slot #4 709 are transmitted.

The 'bandwidth adaptation command 702' may be represented by a minimum of 1 bit to a maximum of N bits (N>1).

In a first 'bandwidth adaptation command' configuration method (1 bit), when the bandwidth that can be adapted by the terminal are two bandwidths 'bandwidth A' and 'bandwidth B', it can represent the bandwidth to be applied by the terminal as 1 bit. For example, if 1 bit information is '0', it means 'bandwidth A', and if 1 bit information is '1', it means 'bandwidth B'.

In a second 'bandwidth adaptation command' configuration method (N bits), it is possible to represent 2N adjustable bandwidths of the terminal by N bits respectively. For example, with 2 bits, '00' means the 'bandwidth A' '01' means the 'bandwidth B', '10' means 'bandwidth C', and '11' means the 'bandwidth D'.

The base station may transmit the 'bandwidth adaptation command 702' to the terminal through at least one of physical layer signaling, MAC layer signaling, and RRC signaling. Among them, the physical layer signaling method is characterized in that the terminal can be rapidly processed. The base station may individually signal (or UE-specific) the 'bandwidth adaptation command' to each terminal or may perform common signaling (UE-group common or common signaling) to a plurality of terminals in the cell.

When the downlink and uplink signals are transmitted and received in the same frequency band as in the TDD system, or when the downlink bandwidth part and the uplink frequency bandwidth part operate in conjunction or connection with each other (e.g., when the uplink bandwidth is also changed from the bandwidth A to the bandwidth B or activated at the time of being changed or activated from the downlink bandwidth A to the bandwidth B), the uplink bandwidth of FIG. 7 may be changed according to the downlink bandwidth change. In other words, when the terminal is adapted or changed from the downlink bandwidth A 701 to the downlink bandwidth B 705 through the bandwidth adaptation command 702 from the base station, the uplink of the terminal may be adapted or changed from the bandwidth A 751 to the uplink bandwidth B 755.

If the uplink control channel transmission resources are configured in each uplink bandwidth configured in the terminal (e.g., if the uplink control channel transmission resources 760 and 770 are configured in the bandwidth A 751 and the bandwidth B 755), the terminal receiving the DCI transmitted from the base station through the downlink control channel 719 in the slot #1 706 may receive the downlink data through the downlink data channel 720 indicated by the DCI and report the reception result HARQ-ACK for the downlink data to the base station through the uplink control channel resource indicated by the DCI at the time (e.g., slot #3 708) indicated by the DCI. The terminal determines that the uplink control channel resource indicated by the DCI is the uplink control channel resource 760 of the uplink bandwidth A 751 which is activated in the bandwidth at the time point to receive the DCI. That is, at the time point (slot #1 706) to receive the DCI in the case of FIG. 7, the base station may correctly receive the reception result of the downlink data 720 that the terminal reports when it is expected that the terminal transmits the reception result through the uplink control channel resource 770 of the uplink bandwidth B 755 since the bandwidth at the time (slot #3 708) to transmit the reception result of the downlink data 720 that the terminal transmits to the base station through the uplink control channel is the bandwidth B 755. Accordingly, a method for correctly determining uplink bandwidth change time point or an uplink control channel transmission resource when the uplink bandwidth changes according to the downlink bandwidth change in the terminal and the base station configured to change the downlink and uplink bandwidths is needed.

A first method includes determining the uplink control channel transmission resource based on the uplink bandwidth activated before K time from uplink control channel transmission start time point or uplink control channel transmission start time point.

A second method includes changing the uplink bandwidth at the time (symbol or slot) to transmit the reception result of the downlink data received through the changed downlink bandwidth according to the reception of the bandwidth adaptation command The first method will be described in more detail as follows. When the downlink and uplink signals are transmitted and received in the same frequency band (or the central frequencies of the downlink and uplink frequency bands are the same) as in the TDD system of FIG. 7, or when the downlink bandwidth part and the uplink frequency bandwidth part operate in conjunction or connection with each other (e.g., when the uplink bandwidth is also changed from the bandwidth A to the bandwidth B or activated at the time of being changed or activated from the downlink bandwidth A to the bandwidth B), the uplink bandwidth of FIG. 7 may be changed according to the downlink bandwidth change. In other words, when the terminal is adapted or changed from the downlink bandwidth A 701 to the downlink bandwidth B 705 through the bandwidth adaptation command 702 from the base station, the uplink of the terminal may be adapted or changed from the bandwidth A 751 to the uplink bandwidth B 755, and the time point (symbol or slot) to change the uplink bandwidth may be the same as the time point to change the downlink bandwidth. The time point (symbol or slot) of the uplink bandwidth change may be after X time from the time point to change the downlink bandwidth, where X may be less than or equal to the symbol length or the slot length, and the X time may be defined by capability of the terminal or previously defined between the base station and the terminal. Further, the X time may be set by the terminal from the base station via the higher signal or may be set from the system information (e.g., a signal transmitted to the SI-RNTI). The base station may transmit the higher signal by including the X value in the transmitted higher signal so as to configure the uplink bandwidth part in the terminal.

If the uplink control channel transmission resources are configured in each uplink bandwidth configured in the terminal as shown in FIG. 7 (if the uplink control channel transmission resources 760 and 770 are configured in the bandwidth A 751 and the bandwidth B 755), the terminal receiving the DCI transmitted from the base station through the downlink control channel 719 in the slot #1 706 may receive the downlink data through the downlink data channel 720 indicated in the DCI and report the reception result HARQ-ACK for the downlink data to the base station through the uplink control channel resource indicated in the DCI at the time (e.g., slot #3 708) indicated in the DCI. Through the first method, the terminal determines that the reception result is transmitted through the bandwidth that is activated in the time (slot #3 708) to transmit the reception result of the downlink data 720 indicated by the DCI 719. The uplink control channel 770 of the bandwidth B 755, so that the base station may correctly receive the reception result of the downlink data 720 that the terminal reports.

Figure 9:
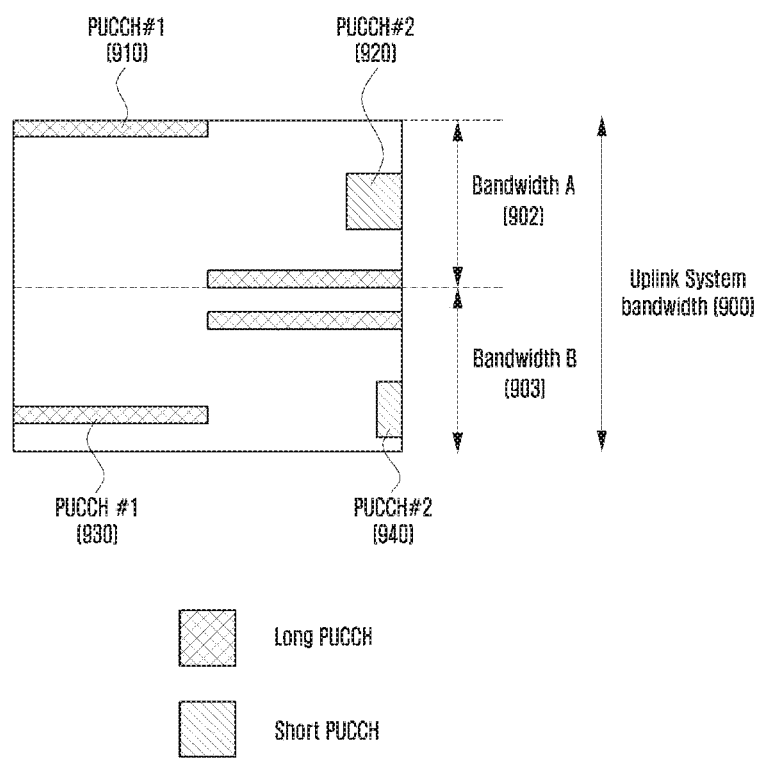
FIG. 9 is a diagram of a terminal, according to an embodiment.

The terminal may be allocated the uplink control channel resources independent of the uplink bandwidth A and the bandwidth B. FIG. 9 is a diagram of a terminal, according to an embodiment. For example, as shown in FIG. 9, a terminal having an uplink bandwidth 900 configured as a bandwidth A 902 and a bandwidth B 903 may be allocated uplink control channel resources in the bandwidth A 902 and the bandwidth B 903, respectively. An uplink control channel #1 910 and an uplink control channel #2 920 may be configured in the bandwidth A 902 and an uplink control channel #1 930 and an uplink control channel #2 940 may be configured in the bandwidth B 903. All the setting values of formats or lengths of each uplink control channel, the frequency resource location, and the like can be independently set, and each setting value of the resources, formats, lengths, and the like of the uplink control channel configured in the bandwidth A 902 and the bandwidth B 903, respectively, may also be independent.

Therefore, as in the first method, when the terminal determines that the reception result is transmitted through the uplink control channel 770 of the bandwidth which is activated in the time (slot #3 708) to transmit the reception result of the downlink data 720 indicated by the DCI 719 (e.g., the bandwidth B 755), it may be determined that the uplink control channel transmission time and resource (or uplink control channel configuration index or uplink control channel format) indicated by the DCI 719 are the uplink control channel transmission time and resource (or uplink control channel configuration index or uplink control channel format) of the bandwidth which is activated in the time (slot #3 708) to transmit the reception result of the downlink data 720 indicated by the DCI 719, not the bandwidth which is activated in time point (slot #1 706) to receive the DCI 719.

In other words, the terminal determines that the uplink control channel transmission time and resource (or uplink control channel configuration index or uplink control channel format, for example, PUCCH #1) indicated by the DCI 719 are the uplink control channel transmission time and resource (or uplink control channel configuration index or uplink control channel format) of the bandwidth which is activated in the time (slot #3 708) to transmit the reception result of the downlink data 720 indicated by the DCI 719 (e.g., the PUCCH#1 930), and transmits the reception result of the downlink data 720 using the PUCCH#1 930.

If the uplink control channel transmission resource (or uplink control channel configuration index or uplink control channel format) configured according to the bandwidth part is configured differently and is not mapped on a one-to-one basis (e.g., when three uplink control channel resources are configured in the bandwidth part A and two uplink control channel resources are configured in the bandwidth part B), the terminal can determine the uplink control channel transmission time and resource (or uplink control channel configuration index or uplink control channel format, for example, PUCCH#1) based on a modulo operation. When three uplink control channel resources are configured in the bandwidth part A and two uplink control channel resources are configured in the bandwidth part B, and when the terminal with the bandwidth part A is activated, when the bandwidth which is activated in the time (slot #3 708) for transmitting the reception result of the downlink data 720 indicated by the DCI 719 is the bandwidth part B, the uplink control channel transmission time and resource (or uplink control channel configuration index or uplink control channel format) that the terminal uses for the uplink control channel transmission may determine the uplink control channel resource (or uplink control channel configuration index or uplink control channel format) indicated by the DCI 719 based on a value obtained by performing the modulo operation with the number of uplink control channel resources (or uplink control channel configuration index or uplink control channel format) configured in the changed bandwidth part B. When three uplink control channel resources (PUCCH #1, PUCCH #2, and PUCCH #3) are configured in the bandwidth part A and two uplink control channel resources (PUCCH#1, PUCCH#2) are configured in the bandwidth part B, if the DCI 719 indicates the uplink control channel transmission through the uplink control channel resource #3 (PUCCH#3), the terminal may transmit the uplink control channel based on the result obtained by performing the modulo operation with the number of indicated control channel resources and the number of control channel resources (or uplink control channel configuration index or uplink control channel format) configured in the changed bandwidth part B (for example, PUCCH #3 mod 2=PUCCH #1), that is, the PUCCH#1 configured in the bandwidth part B.

Figure 8:
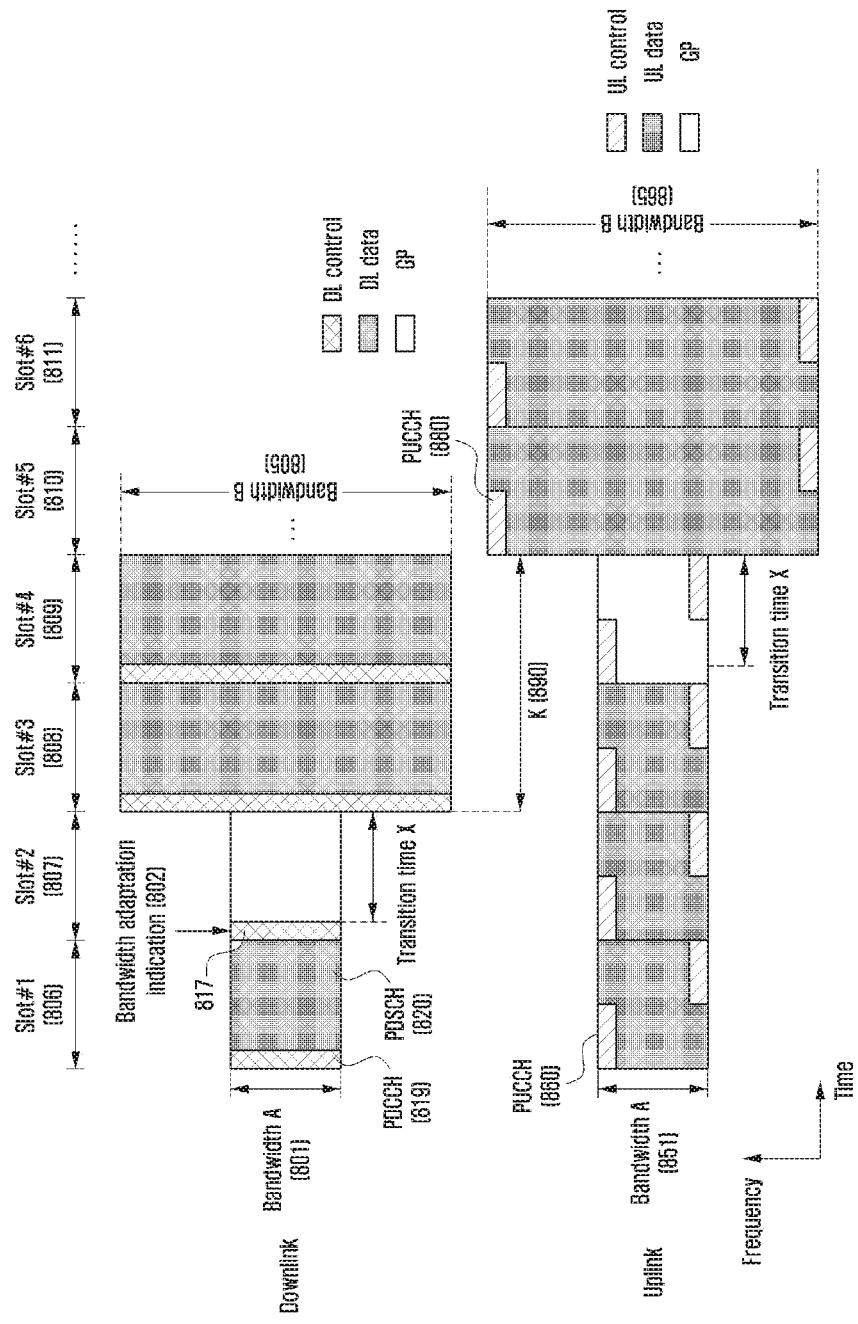
FIG. 8 is a diagram of a system, according to an embodiment.

The second method will be described in more detail as follows. FIG. 8 is a diagram of a system, according to an embodiment. When the downlink and uplink signals are transmitted and received in the same frequency band (or the central frequencies of the downlink and uplink frequency bands are the same) as in the TDD system of FIG. 8, or when the downlink bandwidth part and the uplink frequency bandwidth part operate in conjunction or connection with each other (e.g., when the uplink bandwidth is also changed from the bandwidth A to the bandwidth B or activated at the time of being changed or activated from the downlink bandwidth A to the bandwidth B), the uplink bandwidth of FIG. 8 may be changed according to the downlink bandwidth change.

In other words, when the terminal is adapted or changed from the downlink bandwidth A 801 to the downlink bandwidth B 805 through the bandwidth adaptation command 802 from the base station, the uplink of the terminal may also be adapted or changed from the bandwidth A 851 to the uplink bandwidth B 855, and it may be assumed that the time point (symbol or slot) to change the uplink bandwidth may be the same as the time point to change the downlink bandwidth as in the method 1. If it is assumed that the time point to change the uplink bandwidth is the same as the time point to change the downlink bandwidth as in the first method described with reference to FIG. 7, the terminal determines that the uplink control channel transmission time and resource are the uplink control channel transmission time and resource (or uplink control channel configuration index or uplink control channel format) of the bandwidth which is activated in the time (slot #3 708) to transmit the reception result of the downlink data 720 indicated by the DCI 719, not the bandwidth which is activated in the time point (slot #1 706) to receive the DCI 719, so that the processing time of the terminal may be insufficient between the time point to determine the uplink control channel transmission resource and the uplink control channel transmission execution time.

Therefore, in the second method, the uplink bandwidth is changed in the time (symbol or slot) to transmit the reception result of the downlink data received through the changed downlink bandwidth according to the reception of the bandwidth adaptation command, so that the terminal may determine the uplink control channel which the terminal should transmit based on the bandwidth which is activated in the time point (slot #1 706) to receive the DCI 719.

In other words, when the uplink control channel transmission resources are configured in each uplink bandwidth configured in the terminal as shown in FIG. 8 (e.g., when the uplink control channel transmission resources 860 and 880 are configured in the bandwidth A 851 and the bandwidth B 855 as shown in FIG. 8), the terminal receiving the DCI transmitted from the base station through the downlink control channel 819 in the slot #1 806 may receive the downlink data through the downlink data channel 820 indicated in the DCI and report the reception result HARQ-ACK for the downlink data to the base station through the uplink control channel resource indicated by the DCI 819 among the uplink control channel resources (or uplink control channel configuration index or uplink control channel format) of the uplink bandwidth A 851 activated in the time (for example, slot #1 806) to receive the DCI.

Describing the second method in another scheme, when the terminal is adapted or changed from the downlink bandwidth A 801 to the downlink bandwidth B 805 through the bandwidth adaptation command 802 from the base station, the uplink of the terminal may also be adapted or changed from the bandwidth A 851 to the uplink bandwidth B 855, and it may be determined that the time point (symbol or slot) to change the uplink bandwidth is time point after K time (symbol or slot) elapses from the time point to change the downlink bandwidth. K may be greater than or equal to the symbol length or the slot length, and K may be determined by the capability of the terminal or may be defined in advance between the base station and the terminal. Further, K may be set by the terminal from the base station via the higher signal or may be set from the system information (for example, a signal transmitted to the SI-RNTI). The base station may transmit the higher signal by including the K value in the transmitted higher signal so as to configure the uplink bandwidth part in the terminal. The K value can be transmitted to the terminal by being included in the signal for transmitting the bandwidth adaptation command.

As another scheme, when the terminal adapts or changes from the downlink bandwidth A 801 to the downlink bandwidth B 805 through the bandwidth adaptation command 802 from the base station, the uplink bandwidth of the terminal may also be adapted or changed from the bandwidth A 851 to the uplink bandwidth B 855, and it may be determined that the uplink bandwidth is changed to the bandwidth B 855 just before the reception result of the downlink data transmitted through the changed downlink bandwidth B 805 is reported or transmitted to the base station through the uplink control channel or at the time before the X time from the time point (symbol or slot) to change the uplink bandwidth. The uplink control channel transmitted before the change to the uplink bandwidth B 855 is the uplink control channel determined based on the uplink bandwidth A 851.

As another scheme, when the terminal adapts or changes from the downlink bandwidth A 801 to the downlink bandwidth B 805 through the bandwidth adaptation command 802 from the base station, the uplink bandwidth of the terminal may also be adapted or changed from the bandwidth A 851 to the uplink bandwidth B 855, and it may be determined that the uplink bandwidth is changed to the bandwidth B 855 just before the reception result of the downlink data transmitted through the changed downlink bandwidth B 805 is first reported or transmitted to the base station through the uplink control channel or at the time before the X time from the time point (symbol or slot) to change the uplink bandwidth. X may be less than or equal to the symbol length or the slot length, and the X time may be determined by the capability of the terminal or may be defined in advance between the base station and the terminal. Further, the X time may be set by the terminal from the base station via the higher signal or may be set from the system information (for example, a signal transmitted to the SI-RNTI). The base station may transmit the higher signal by including the X value in the transmitted higher signal so as to configure the uplink bandwidth part in the terminal. The uplink control channel transmitted before the change to the uplink bandwidth B 855 is the uplink control channel determined based on the uplink bandwidth A 851.

Based on the uplink bandwidth change time point determined by the second method, the terminal may determine that the uplink control channel which is configured or indicated to be transmitted at the following time including the bandwidth change time point is the uplink control channel resource (or uplink control channel configuration index or uplink control channel format) 880 determined based on the changed bandwidth B 855 and determine that the uplink control channel transmitted before the change to the uplink bandwidth B 855 is the uplink control channel 860 determined based on the uplink bandwidth A 851.

Third Embodiment

A terminal may receive, as a higher signal, system information (MIB, SIB), downlink control information (DCI), configuration information (e.g., at least one information of an uplink control channel format, a transmission starting symbol, the number of transmission symbols including the transmission starting symbol, a transmission start RB, the number of transmission RBs including the transmission start RB, a sequence, an initial cyclic shift value to be applied to the sequence, frequency hopping ON/OFF information, time/frequency resource allocation information of a second hop when the frequency hopping is ON, orthogonal sequence information, and the like) on the uplink control channel transmitting uplink control information (e.g., SR information, reception result (HARQ-ACK) of a downlink data channel, CSI and the like) to a base station, determine at least one or a combination thereof among the received information, and determine the uplink control channel format and the transmission configuration information for the format which can be used at the time of transmitting the uplink control information through the uplink control channel.

Figure 14:
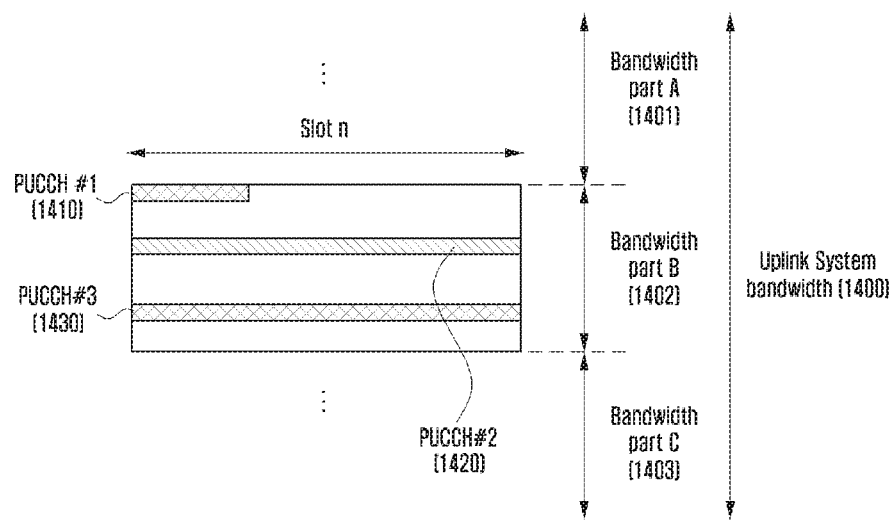
FIG. 14 is a diagram of unlink control channel transmission in an uplink bandwidth part, according to an embodiment.

FIG. 14 is a diagram of unlink control channel transmission in an uplink bandwidth part, according to an embodiment. FIG. 14 illustrates the uplink control channel transmission in an uplink bandwidth part 1402 configured and determined in the first to second embodiments in slot n, among uplink system bandwidths 1400 configured in the terminal. The terminal may in advance receive the configuration information on the uplink control channel for transmitting the scheduling request information through the higher signal from the base station. The terminal may be allocated a plurality of uplink control channels in order to identify the scheduling request information for data, a logical channel, or a logical channel group for the uplink transmission. For example, in FIG. 14, PUCCH #1 1410 is an uplink control channel configured to transmit scheduling request information for a first logical channel, and PUCCH #2 1420 is an uplink control channel configured to transmit scheduling request information for a second logical channel.

When the terminal requires uplink data transmission for the first logical channel, the terminal transmits the scheduling request information to the base station through the PUCCH #1 1410, so that the base station may configure or allocate the uplink data channel transmission resource suitable for the logical channel (first logical channel) that the terminal should transmit. In addition, the terminal may be allocated PUCCH #3 1430 which is the uplink control channel for reporting to the base station the reception result of the downlink data channel received in the slot n or the previous slot from the base station. The configuration information for the uplink control channels for transmitting the uplink control information may be independently configured. In other words, the uplink control channel transmission format for PUCCH #1 1410, PUCCH #2 1420, and PUCCH #3 1430 may be configured independently. Therefore, the uplink control channel transmission formats for the PUCCH #1 1410, the PUCCH #2 1420, and the PUCCH #3 1430 can be all configured differently. The transmission length of the uplink control channel or the length of the transmission interval for the PUCCH #1 1410, the PUCCH #2 1420, and the PUCCH #3 1430 may be configured independently. Therefore, the transmission length of the uplink control channel or the length of the transmission interval for the PUCCH #1 1410, the PUCCH #2 1420, and the PUCCH #3 1430 can be all configured differently.

The terminal may be allocated a plurality of configurations for the uplink control channel through the higher signal from base station so as to report the reception result of the downlink data channel received from the slot n or the previous slot to the base station in the slot n. The downlink control information for scheduling the downlink data channel may include an indicator indicating whether to report the reception result of the downlink data channel using any uplink control channel configuration among the plurality of uplink control channel configuration information configured in the terminal, and the terminal may report the reception result according to the uplink control channel 1430 configuration indicated by the indicator.

Therefore, in the scenario that the terminal reports the reception result of the downlink data channel received from the base station in the slot n or the previous slot to the base station in the slot n, when the terminal should transmit the scheduling request information in the slot n (in other words, when a plurality of uplink control information different from each other is transmitted in the slot n or a plurality of different uplink control information is transmitted at the same time), the terminal may transmit two uplink control channels, respectively, to transmit the uplink control information or use only one of the two uplink control channels to transmit one or a plurality of uplink control information. Generally, since the available power which can be used for signal transmission of the terminal is limited, it is preferable to transmit the uplink control information using only one of the two uplink control channels. The terminal may transmit the reception result of the downlink data channel using PUCCH #1 1410 which is the uplink control channel for transmitting the scheduling request information.

Since the base station knows that the terminal will transmit the reception result of the downlink data channel through the uplink control channel PUCCH #3 1430 in the slot n, if the base station receives the reception result of the downlink data channel in the uplink control channel PUCCH#1 1410 configured to transmit the scheduling request information to the terminal, the base station may determine that the reception result of the downlink data channel and the scheduling request information for the logical channel corresponding to the uplink control channel PUCCH#1 1410 are transmitted. If the terminal transmits the scheduling request information for the logical channel corresponding to the uplink control channel PUCCH #2 1420 in the slot n, the terminal may transmit the reception result of the downlink data channel through the uplink control channel PUCCH #2 1420. The base station which has received the reception result of the downlink data channel in the uplink control channel PUCCH #2 1420 configured to transmit the scheduling request information to the terminal may be determined that the reception result of the downlink data channel and the scheduling request information for the logical channel corresponding to the uplink control channel PUCCH #2 (1420) are transmitted.

Each uplink control channel format corresponding to each uplink control information is different, or the uplink control channel format is the same, but the length (or the number of symbols on the time axis configuring the uplink control channel) of the uplink control channel is different or the uplink control channel format is the same but at least one of the transmission sequence, the orthogonal sequence, and the cyclic shift value may be different. For the sake of convenience of description, the third embodiment will describe the case that the length of the uplink control channel corresponding to the uplink control information is different. However, as described above, the method described in the disclosure may be applied to even the case that at least one of various configuration elements configuring the uplink control channel, including the uplink control channel format, the uplink control channel sequence, and the orthogonal sequence of the uplink control channel is different.

The PUCCH #1 1410 is the uplink control channel for transmitting the scheduling request information for the first logical channel in the slot n, the PUCCH #2 1420 is the uplink control channel transmitting the scheduling request information for the second logical channel in the slot n, the PUCCH #3 1430 is the uplink control channel for reporting the reception result of the downlink data channel in the slot n, and the PUCCH #3 1430 is the uplink control channel configured to allow the base station to report the reception result to the terminal through the downlink control signal information scheduling the downlink data channel. If the terminal simultaneously transmits the scheduling request information for the first logical channel and the reception result of the downlink data channel in the slot n, the terminal transmits the reception result of the downlink data channel through the PUCCH #1 1410 to transmit both the scheduling request information and the reception result of the first logical channel to the base station. However, the configuration information of the PUCCH #3 1430 instructed by the base station to be used for the terminal. The length of the PUCCH #3 1430 is different from that of the PUCCH #1 1410. It is assumed that both the PUCCH #3 1430 and the PUCCH #1 1410 are the PUCCH format 1.

When different uplink control information is simultaneously transmitted as described above or when each uplink control channel transmission resource corresponding to different uplink control information overlap in time over at least one symbol, the terminal may transmit the uplink control information in one of the uplink control channels corresponding to the uplink control information to be transmitted. When the terminal simultaneously transmits the scheduling request information for the first logical channel and the reception result of the downlink data channel in the slot n or when the uplink control channel PUCCH#1 for transmission the scheduling request information for the first logical channel and the uplink control channel PUCCH #3 for transmission the reception result of the downlink data channel overlap in time over at least one symbol, the terminal may transmit the reception result of the downlink data channel through the PUCCH #1 1410, and transmit both the scheduling request information (hereinafter, SR1) for the first logical channel and the reception result (hereinafter, HARQ-ACK) to the base station.

When the length of the PUCCH (or the number of PUCCH symbols, N_PUCCH_symb) configured for the PUCCH #1 1410 and the PUCCH #3 1430 are different from each other, the terminal may use the configuration information of the PUCCH #1 to generate the reception result information for the downlink data channel, and transmit the generated reception result information through the time and frequency resources configured for the PUCCH #1 1410.

A first scheme for generating an HARQ-ACK signal to be transmitted with the same PUCCH resource set value as that in the case of transmitting only SR1 to the PUCCH #1 1410 will be described in detail.

In the first scheme, except for bit information (e.g., when only the SR is transmitted, the bit information transmitted from the PUCCH#1 1410 is d(0)=1) transmitted from the PUCCH #1 1410, the terminal may use the configuration information configured for the PUCCH#1 1410 to generate the signal for the HARQ-ACK information and transmit the generated HARQ-ACK information through the time and frequency resources configured in the PUCCH#1 1410. The terminal may encode the reception result of the received downlink data and the HARQ-ACK bit information using the BPSK or QPSK scheme and the like to generate the information d(0) to be transmitted, multiply a specific sequence (for example, Zadoff-Chu sequence) by the signal, and spread it by using the orthogonal sequence value w_i (m), thereby generating a signal to be transmitted through the PUCCH #1 1410. In other words, except for the information d(0), the terminal may generate the HARQ-ACK signal to be transmitted with the same PUCCH resource set value as that when transmitting only SR1 to the PUCCH #1 1410, and transmit the generated HARQ-ACK signal in the signal and frequency resource allocated to the PUCCH#1 1410. The PUCCH resource configuration information for the PUCCH #1 1410 is a PUCCH resource configured for the PUCCH #1 1410, and includes at least one of the following PUCCH resources described in the scheme for determining the PUCCH format as described above.

PUCCH transmission starting symbol, the number of PUCCH transmission symbols, index indicating the start PRB, the number of transmission PRBs, the frequency hopping configuration, the frequency resources of the second hop when the frequency hopping is indicated, and the initial CS value, index of time axis orthogonal cover code (OCC), length of Pre-DFT OCC, index of Pre-DFT OCC.

When the terminal transmits only the SR1 using the PUCCH format 1, the terminal transmits the PUCCH format 1 by multiplying d(0) by 1 or d(0) when transmitting NACK/DTX. By doing so, when the terminal simultaneously transmits a positive SR and an HARQ-ACK in one slot, in the case that the terminal misses the downlink control channel transmitted by the base station even though the terminal generates the HARQ-ACK signal to be transmitted with the same setting value as that in the case of transmitting only the SR1 to the PUCCH #1 1410 except for the information d(0), the base station simultaneously determines that the NACK/DTX and the positive SR are transmitted and that only the positive SR is transmitted, thereby retransmitting the downlink data.

A second scheme for generating an HARQ-ACK signal to be transmitted with the same PUCCH resource set value as that in the case of transmitting only SR1 to the PUCCH #1 1410 will be described in detail.

In the second scheme, the terminal generates the PUCCH #3 for the HARQ-ACK transmission and sets the generated PUCCH #3 to the PUCCH resource of the PUCCH #1 configured for the SR1 transmission. In particular, the PUCCH #3 is punctured or repeatedly transmitted to match the number of transmission symbols. In the second scheme, since there is no need to rate-match the PUCCH #3 for the HARQ-ACK transmission according to the PUCCH resources of the PUCCH #1 to generate a new channel, it is advantageous in that when the terminal needs to transmit uplink data requiring a short delay or transmit the scheduling request information for a specific logical channel or a logical channel group. When 13 symbols of the PUCCH #3 for the transmission of PUCCH #3 is generated and 8 symbols are set for the transmission of the PUCCH #1, the terminal transmits the PUCCH #3 in the PUCCH resource of the PUCCH #1 by transmitting only the front 8 symbols and puncturing the rear 5 symbols among 13 symbols of the PUCCH #3. When 5 symbols of the PUCCH #3 for the transmission of PUCCH #3 is generated and 8 symbols are set for the transmission of the PUCCH #1, the terminal transmits the PUCCH #3 in the PUCCH resource of the PUCCH #1 by transmitting the front 5 symbols of the PUCCH #3 and additionally transmitting 3 symbols from the front of the PUCCH #3 in addition to the remaining 3 symbols. As the initial CS value, the terminal uses a value included in the PUCCH resource indicated from the downlink control channel for the PUCCH #3.

When the length of the PUCCH (or the number of PUCCH symbols, N_PUCCH_symb) configured for the PUCCH #1 1410 and the PUCCH #3 1430 are the same as each other, the terminal may use the configuration information of the PUCCH #3 1430 to generate the reception result information for the downlink data channel, and transmit the generated reception result information through the time and frequency resources configured for the PUCCH #1 1410. More specifically, the terminal may encode the reception result of the received downlink data. The HARQ-ACK information using the BPSK or QPSK scheme to generate d(0) and multiply a specific sequence (for example, Zadoff-Chu sequence) by d(0), and generate the spread signal by using the orthogonal sequence value w_i (m). In other words, the terminal generates the HARQ-ACK signal to be transmitted with the same set value as that in the case of transmitting only the HARQ-ACK to the PUCCH #3 1430, and transmits the generated HARQ-ACK signal in the signal and frequency resources allocated to the PUCCH #1. The configuration information for the PUCCH #3 includes a Zadoff-Chu sequence, a Zadoff-Chu sequence group number, an intra-group sequence number, a PUCCH length (or the number of PUCCH symbols, N_PUCCH_symb) configured for the PUCCH #1, the frequency hopping configuration, the number of symbols for the first and second hopping intervals or spreading factors (N_PUCCH_SF0, N_PUCCH_SF1) for the first and second hopping intervals upon the activation of the frequency hopping, the orthogonal sequence value therefor, and all the set values required to generate the uplink control channel, and the configuration information may receive the higher signal through the downlink control information, and the configuration information may be determined by a method for indicating, by downlink control information, one of the set values set based on a combination of the higher signal and the downlink control information or the higher signal, and the like. When the length of the PUCCH (or the number of PUCCH symbols, N_PUCCH_symb) configured for the PUCCH #1 1410 and the PUCCH #3 1430 are the same as each other, the terminal may use the configuration information of the PUCCH #1 1410 to generate the reception result information for the downlink data channel, and transmit the generated reception result information through the time and frequency resources configured for the PUCCH #1 1410.

Next, in the situation where different control information (HARQ-ACK and SR) should be transmitted within one slot, a method for transmitting control information according to a PUCCH format will be described with reference to fourth and fifth embodiments.

Fourth Embodiment

In another embodiment, the terminal receives the higher signal configuration from the base station to transmit the scheduling request information through the PUCCH format 0 which is the short PUCCH format or the PUCCH format 1 which is the long PUCCH format, and considers the situation where the scheduling request information is to be transmitted in slot n to transmit the uplink data for at least one logical channel through the configured PUCCH format by the terminal. Further, in order for the terminal to transmit the reception result (HARQ-ACK) of the downlink data channel in the slot n through PUCCH format 0 which is another short PUCCH format, when the terminal receives an indication through a specific bit field from the downlink control channel from the base station or induces the indication by the downlink control channel resource, the slot index, the terminal unique ID, the terminal may perform the following operations to transmit the scheduling request information and the reception result of the downlink data channel in the slot n.

First, when the PUCCH format 0 or the PUCCH format 1 for transmitting the scheduling request information and the PUCCH format 0 for transmitting the reception result of the downlink data channel overlap each other in at least one OFDM symbol of the slot n, the terminal performs the following operation 1 to be described later, and when they do not overlap each other even in one OFDM symbol, the terminal transmits the scheduling request information through the configured PUCCH format for the scheduling request transmission in the slot n and transmits the HARQ-ACK through the PUCCH format 0.

Second, when the PUCCH format 0 or the PUCCH format 1 for transmitting the scheduling request information and the PUCCH format 0 for transmitting the reception result of the downlink data channel are transmitted in the same slot (e.g., slot n), the terminal performs the following first operation to be described later and when they are not transmitted in the same slot, the terminal configures only one control information to be transmitted in the slot n or performs the transmission through the configured PUCCH format.

Start First Operation

When the terminal transmits the HARQ-ACK in the slot n through the PUCCH format 0, the terminal additionally applies the CS offset for the scheduling request. A specific procedure is as follows.

The terminal generates the sequence based on the group hopping or sequence hopping configuration that is configured as the higher signal from the base station and the configured ID and cyclically shifts the generated sequence based on a final CS value obtained by adding other CS values and offset for additionally transmitting the scheduling request information to the indicated initial CS value for the HARQ-ACK transmission according to ACK or NACK to be mapped to 12 subcarriers so as to transmit the generated sequence. When the HARQ-ACK is 1 bit, in the case of the ACK as shown in the following Table 7, the final CS is generated by adding 6 and offset 3 for additionally transmitting the scheduling request information to the initial CS value and in the case of the NACK, the final CS is generated by adding 0 and offset 3 for additionally transmitting the scheduling request information to the initial CS value. 0 which is the CS value for the NACK, 6 which is the CS value for the ACK and 3 which is the CS offset value for additional the scheduling request are defined in the specification as shown in the following table, and the terminal always generates the PUCCH format 0 according to the values to transmit the 1-bit HARQ-ACK and the scheduling request information.

TABLE 7

| 1-bit HARQ-ACK + SR | NACK | ACK |
|---|---|---|
| Final CS | (initial CS + 0 + 3) mod 12 = (initial CS + 3) mod 12 | (initial CS + 6 + 3) mod 12 = (initial CS + 9) mod 12 |

When the HARQ-ACK is 2 bits, in the case of (NACK, NACK) as shown in the following Table 8, the final CS is generated by adding 0 and offset 1 for additionally transmitting the scheduling request information to the initial CS value, in the case of (NACK, ACK), the final CS is generated by adding 3 and offset 1 for additionally transmitting the scheduling request information to the initial CS value, in the case of (ACK, ACK), the final CS is generated by adding 6 and offset 1 for additionally transmitting the scheduling request information to the initial CS value, and in the case of (ACK, NACK), the final CS is generated by adding 9 and offset 1 for additionally transmitting the scheduling request information to the initial CS value. 0 which is the CS value for the (NACK, NACK), 3 which is the CS value for the (NACK, ACK), 6 which is the CS value for the (ACK, ACK), 9 which is the CS value for the (ACK, NACK), and 1 which the CS offset value for additional scheduling request are defined in the specification as shown in the following table, and the terminal always generates the PUCCH format 0 according to the values and transmits the 2-bit HARQ-ACK and the scheduling request information.

If the final CS value exceeds 12 due to the CS value added to the initial CS value according to the ACK or NACK or the scheduling information transmission, it is obvious that the length of the sequence is 12, and therefore the modulo 12 is applied.

TABLE 8

| | 2-bit HARQ-ACK + SR | | | |
|---|---|---|---|---|
| | NACK, NACK | NACK, ACK | ACK, ACK | ACK, NACK |
| Final CS | (initial CS + 0 + 1) mod 12 = (initial CS + 1) mod 12 | (initial CS + 3 + 1) mod 12 = (initial CS + 4) mod 12 | (initial CS + 6 + 1) mod 12 = (initial CS + 7) mod 12 | (initial CS + 9 + 1) mod 12 = (initial CS + 10) mod 12 |

Fifth Embodiment

In another embodiment, the terminal receives the higher signal configuration from the base station to transmit the scheduling request information through the PUCCH format 0 which is the short PUCCH format, and considers the situation where the scheduling request information is to be transmitted in slot n to transmit the uplink data for at least one logical channel by the configured PUCCH format by the terminal. Further, in order for the terminal to transmit the reception result (HARQ-ACK) of the downlink data channel through PUCCH format 1 which is the long PUCCH format, when the terminal receives an indication through a specific bit field from the downlink control channel from the base station or induces the indication by the downlink control channel resource, the slot index, the terminal unique ID, the terminal may perform the following operations to transmit the scheduling request information and the reception result of the downlink data channel in the slot n.

First, when the PUCCH format 0 for transmitting the SR information and the PUCCH format 1 for transmitting the reception result of the downlink data channel overlap each other in at least one OFDM symbol of the slot n, the terminal performs the following operation 2 to be described later. If they do not overlap each other in at least one OFDM symbol of the slot n, the terminal transmits the scheduling request in the slot n through the PUCCH format 0, and transmits the HARQ-ACK through the PUCCH format 1.

Second, when the PUCCH format 0 for transmitting the scheduling request information and the PUCCH format 1 for transmitting the reception result of the downlink data channel are transmitted in the same slot (that is, slot n), the terminal performs the following second operation to be described later and when they are not transmitted in the same slot, the terminal configures only one control information to be transmitted in the slot n or performs the transmission through the configured PUCCH format.

Start Second Operation

The terminal may perform one of the following four methods.

In the first method, the terminal transmits only the HARQ-ACK in the slot n through the PUCCH format 1. Alternatively, as the second method, the terminal transmits only the SR from the slot n through the PUCCH format 0. Alternatively, as the third method, the terminal may additionally apply the CS offset for the HARQ-ACK transmission when transmitting the SR in the slot n through the PUCCH format 0 and the specific procedure is as follows. The terminal generates the sequence based on the group hopping or sequence hopping configuration that is configured as the higher signal from the base station and the configured ID and cyclically shifts the generated sequence based on a final CS value obtained by adding other CS offset to the indicated initial CS value for the SR transmission according to ACK or NACK to be mapped to 12 subcarriers so as to transmit the generated sequence. If the HARQ-ACK is 1 bit, as shown in Table 9, in the case of the ACK, the final CS is generated by adding 6 to the initial CS value for the SR transmission, and in the case of the NACK, the final CS is generated by adding 0 to the initial CS value. 0 which is the CS value for the NACK and 6 which is the CS value for the ACK are defined in the specification as shown in Table 9, and the terminal generates the PUCCH format 0 according to the values all the times to transmit the scheduling request information and the 1-bit HARQ-ACK. When being set as the higher signal to transmit the 1-bit HARQ-ACK (or when being set as the higher signal to receive only one codeword or one PDSCH), the initial CS value for the SR transmission is limited to 0, 1, 2, 3, 4, and 5.

TABLE 9

| SR + 1-bit HARQ-ACK | NACK | ACK |
|---|---|---|
| Final CS | (initial CS for SR transmission + 0) mod 12 | (initial CS for SR transmission + 6) mod 12 |

When the HARQ-ACK is 2 bits, as shown in Table 10, in the case of (NACK, NACK), the final CS is generated by adding 0 to the initial CS value for SR transmission, in the case of (NACK, ACK), the final CS is generated by adding 3 to the initial CS value, in the case of (ACK, ACK), the final CS is generated by adding 6 to the initial CS value, and in the case of (ACK, NACK), the final CS is generated by adding 9 to the initial CS value. 0 which is the CS value for the (NACK, NACK), 3 which is the CS value for the (NACK, ACK), 6 which is the CS value for the (ACK, ACK), and 9 which is the CS value for the (ACK, NACK) are defined in the specification as shown in Table 10, and the terminal always generates the PUCCH format 0 according to the values and transmits the scheduling request information and the 2-bit HARQ-ACK. When being set as the higher signal to transmit the 2-bit HARQ-ACK (or when being set as the higher signal to receive two codewords or two PDSCHs), the initial CS value for the SR transmission is limited to 0, 1, and 2.

If the final CS value exceeds 12 due to the CS value added according to the ACK or NACK transmission in the initial CS value for the SR transmission, it is obvious that the length of the sequence is 12, and therefore the modulo 12 is applied.

TABLE 10

| | SR + 2-bit HARQ-ACK | | | |
|---|---|---|---|---|
| | NACK, NACK | NACK, ACK | ACK, ACK | ACK, NACK |
| Final CS | (initial CS for SR transmission + 0) mod 12 | (initial CS for SR transmission + 3) mod 12 | (initial CS for SR transmission + 6) mod 12 | (initial CS for SR transmission + 9) mod 12 |

Alternatively, as the fourth method, the terminal may additionally apply the CS offset for the SR transmission when transmitting the HARQ-ACK in the slot n through the PUCCH format 1 and the specific procedure is as follows. When generating the sequence for the UCI symbol of the PUCCH format 1, an additional CS offset for the scheduling request information is applied. The terminal generates the sequence based on the group hopping or the sequence hopping configuration and the configured ID which are configured by the higher signal from the base station and cyclically shifts the generated sequence by a value obtained by adding the additional CS offset for the scheduling request information to the initial CS value indicated in the PUCCH resource, thereby generating a sequence corresponding to a length of 1 RB. The terminal applies the generated sequence for at least a DMRS symbol or a UCI symbol of the PUCCH format 1. The terminal configures the PUCCH format 1 through a combination of the UCI symbol and the DMRS symbol according to the disclosure and transmits the PUCCH format 1 in the slot n.

Figure 10:
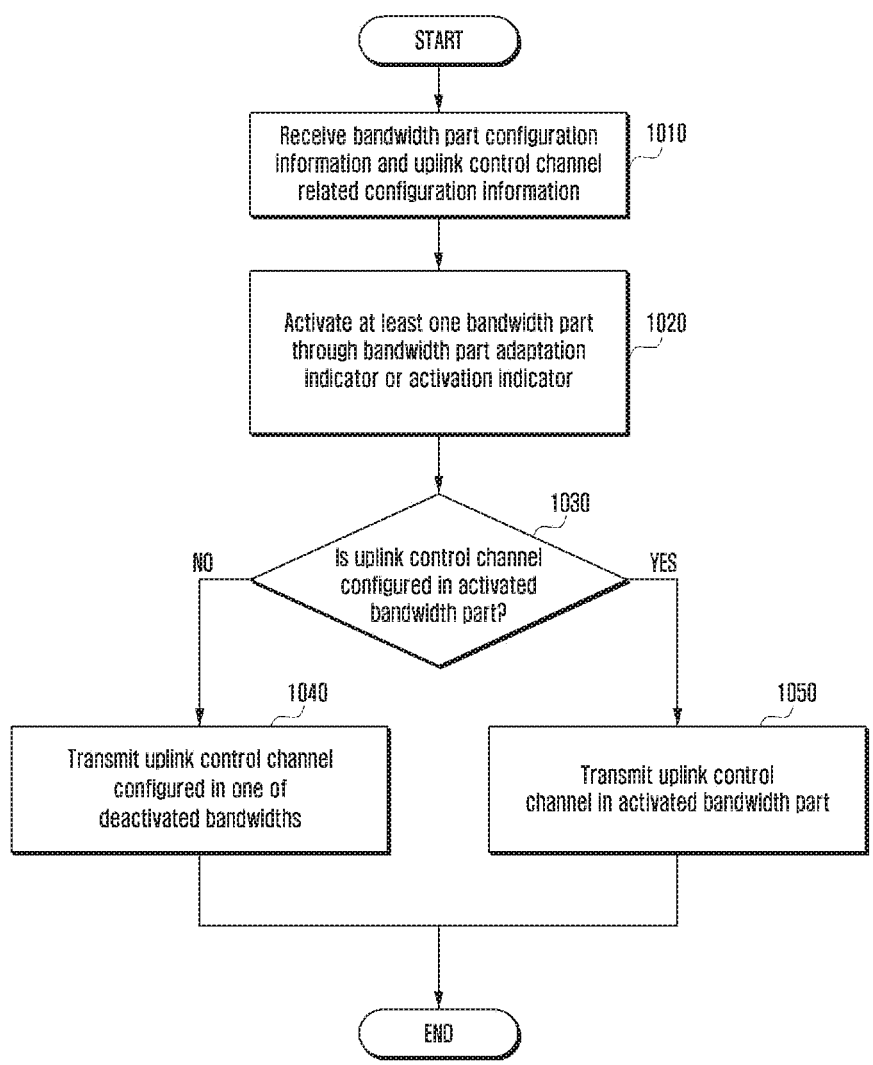
FIG. 10 is a diagram of a terminal operation according to an embodiment.

FIG. 10 is a diagram of a terminal operation according to an embodiment. The operation of the terminal according to the first embodiment will be described with reference to FIG. 10. In step 1010, the terminal receives the configuration information (e.g., Table 1) on the bandwidth part and the uplink control channel related configuration information as shown in the above Table 2 on one or the plurality of bandwidth parts from the base station through the higher signal, the broadcast channel, or the downlink data channel including system information (e.g., downlink data channel scheduled with DCI scrambled with SI-RNTI). In step 1020, the terminal activates at least one downlink and uplink bandwidth part based on a bandwidth part adaptation indicator or an activation indicator through the DCI transmitted through the higher signal or the downlink control channel. When the downlink bandwidth part and the uplink bandwidth part operate in conjunction with each other, the uplink bandwidth part may be changed and activated together with the downlink bandwidth part adaptation indicator.

If the terminal transmits the reception result of the downlink data received from the base station or the periodic channel state information or the SRS information or transmits the SR information, it is determined in step 1030 whether the uplink control channel is configured in the currently activated uplink bandwidth part. If it is determined in step 1030 that the uplink control channel is configured in the uplink bandwidth part, in step 1050, the terminal transmits the uplink signal using the uplink control channel configured by the base station in the activated uplink bandwidth part or the uplink control channel indicated through the DCI by the base station. If it is determined in step 1030 that the uplink control channel is not configured in the uplink bandwidth part, the terminal may activate the bandwidth part in which the uplink control channel is configured by the method described in the first embodiment of the disclosure in step 1040 and transmit the uplink signal through the uplink control channel configured in the bandwidth part.

Figure 11:
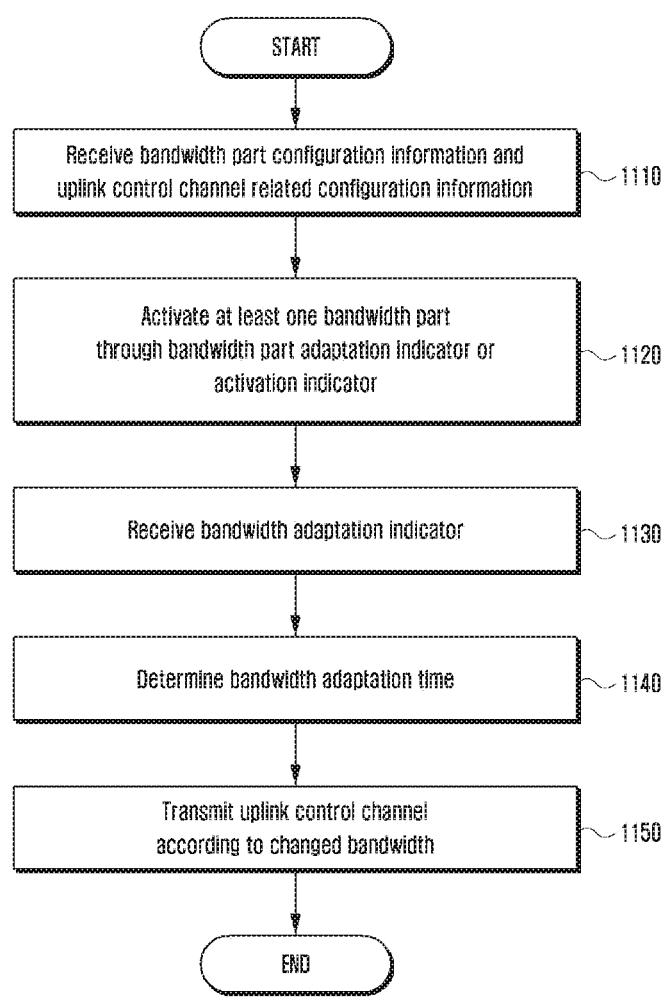
FIG. 11 is a diagram of a terminal operation according to an embodiment.

FIG. 11 is a diagram of a terminal operation according to an embodiment. The operation of the terminal according to the second embodiment will be described with reference to FIG. 11. In step 1110, the terminal receives the configuration information (e.g., Table 1) on the bandwidth part and the uplink control channel related configuration information as shown in the above Table 2 on one or the plurality of bandwidth parts from the base station through the higher signal, the broadcast channel, or the downlink data channel including system information (e.g., downlink data channel scheduled with DCI scrambled with SI-RNTI). In step 1120, the terminal activates at least one downlink and uplink bandwidth part based on a bandwidth part adaptation indicator or an activation indicator through the DCI transmitted through the higher signal or the downlink control channel. At this time, when the downlink bandwidth part and the uplink bandwidth part operate in conjunction with each other, the uplink bandwidth part may be changed and activated together with the downlink bandwidth part adaptation indicator.

When the uplink bandwidth part is changed and activated together with the downlink bandwidth part adaptation indicator, if the terminal has to transmit the reception result of the downlink data received from the base station or if the periodic channel state information or the SRS information or the SR information needs to be transmitted, the terminal may determine the change or activation time of the uplink bandwidth part according to the first or second method described in the second embodiment of the disclosure (1130, 1140), determine the uplink control channel resource (or uplink control channel configuration index or uplink control channel format) configured in the determined activation bandwidth part, and transmit the uplink signal through the control channel resource (1150).

Figure 12:
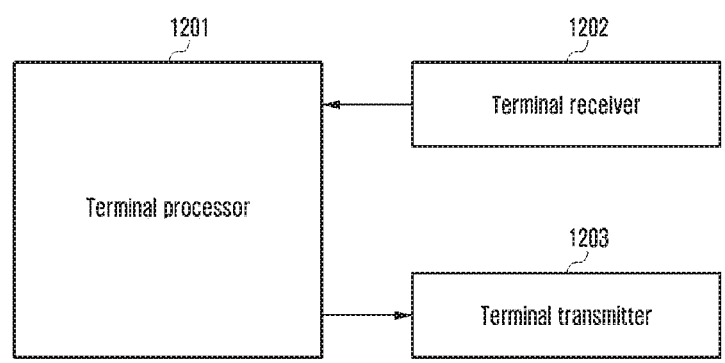
FIG. 12 is a diagram of an internal structure of the terminal according to an embodiment.
Figure 13:
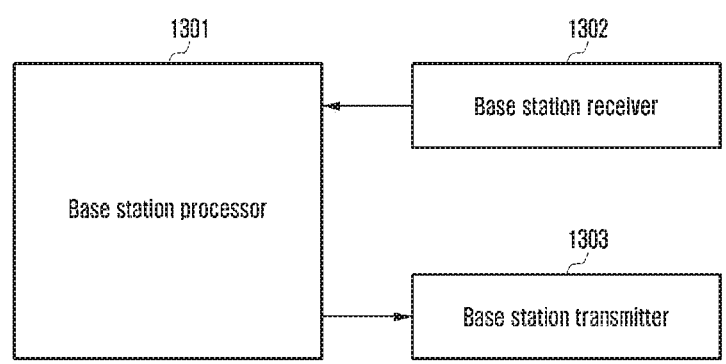
FIG. 13 is a diagram of an internal structure of the base station according to an embodiment.

In order to perform the above-described embodiments, a transmitter, a receiver, and a controller of the terminal and the base station are each illustrated in FIGS. 12 and 13. The method for sharing resources between a data channel and a control channel in a 5G communication system corresponding to the above embodiments, a method of designating a data starting point, and a structure of a base station and a terminal for performing various signaling therefor are shown, and a transmitter, a receiver, and a processor of the terminal and the base station for performing the same should each be operated according to the embodiments.

FIG. 12 is a diagram of an internal structure of the terminal according to an embodiment. As illustrated in FIG. 12, the terminal of the disclosure may include a terminal processor 1201, a receiver 1202, and a transmitter 1203.

The terminal processor 1201 may control a series process so that the terminal may be operated according to the embodiment of the disclosure as described above. In accordance with information such as a bandwidth configuration method, a bandwidth adaptation method, and a control channel transmission resource configuration method for an uplink control channel, the transmission operation of the uplink bandwidth activation of the terminal, the uplink control channel, and the data channel can be controlled differently. The terminal receiver 1202 and the terminal transmitter 1203 are collectively referred to as a transceiver. The transceiver may transmit/receive a signal to/from the base station. The signal may include control information and data. To this end, the transceiver may include an RF transmitter that up-converts and amplifies a frequency of the transmitted signal, an RF receiver that low-noise-amplifies the received signal and down-converts the frequency, and the like. Further, the transceiver may receive a signal through a radio channel and output the received signal to the terminal processor 1201 and transmit the signal output from the terminal processor 1201 on the radio channel.

FIG. 13 is a diagram of an internal structure of the base station according to an embodiment. As illustrated in FIG. 13, the base station of the disclosure may include a base station processor 1301, a receiver 1302, and a transmitter 1303.

The base station processor 1301 may control a series process so that the base station may be operated according to the embodiment of the disclosure as described above. The control may be made differently according to the bandwidth configuration method, the bandwidth adaptation method, the control channel resource area configuration method for the uplink control channel and the like. In addition, various additional indicators may be controlled to be transmitted as needed. The base station receiver 1302 and the base station transmitter 1303 are collectively referred to as a transceiver. The transceiver may transmit/receive a signal to/from the terminal. The signal may include control information and data. To this end, the transceiver may include an RF transmitter that up-converts and amplifies a frequency of the transmitted signal, an RF receiver that low-noise-amplifies the received signal and down-converts the frequency, and the like. Further, the transceiver may receive a signal through a radio channel and output the received signal to the base station processor 1301 and transmit the signal output from the base station processor 1301 through the radio channel.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
identifying that a transmission of an acknowledgement/negative-acknoweldgement (ACK/NACK) and a transmission of a scheduling request (SR) overlap in a slot;
transmitting, to a base station, the ACK/NACK and the SR in the slot, in case that a first physical uplink control channel (PUCCH) format for the transmission of the ACK/NACK is PUCCH format 0; and
transmitting, to the base station, the ACK/NACK without the SR in the slot, in case that the first PUCCH format for the transmission of the ACK/NACK is PUCCH format 1 and a second PUCCH format for the transmission of the SR is PUCCH format 0.

2. The method of claim 1, wherein, in case that the first PUCCH format is PUCCH format 0, a first value for determining a cyclic shift of a sequence for PUCCH format 0 is identified based on a value of the ACK/NACK.

3. The method of claim 2, wherein the first value is different from a second value for a transmission of an ACK/NACK without SR by using PUCCH format 0, and
wherein a difference between the first value and the second value is 3, in case that the ACK/NACK includes 1 bit.

4. The method of claim 1, wherein, in case that the first PUCCH format is PUCCH format 0, a value for determining a cyclic shift of a sequence for the PUCCH format 0 is added with a predetermined value associated with a positive SR.

5. The method of claim 1, wherein, in case that the first PUCCH format is PUCCH format 1 and the second PUCCH format is PUCCH format 0, the SR is dropped.

6. A method performed by a base station in a wireless communication system, the method comprising:
identifying that a reception of an acknowledgement/negative-acknowledgment (ACK/NACK) and a reception of a scheduling request (SR) overlap in a slot;
receiving, from the terminal, the ACK/NACK and the SR in the slot, in case that a first physical uplink control channel (PUCCH) format for the reception of the ACK/NACK is PUCCH format 0; and
receiving, from the terminal, the ACK/NACK without the SR in the slot, in case that the first PUCCH format for the reception of the ACK/NACK is PUCCH format 1 and a second PUCCH format for the reception of the SR is PUCCH format 0.

7. The method of claim 6, wherein, in case that the first PUCCH format is PUCCH format 0, a first value for determining a cyclic shift of a squence for PUCCH format 0 is identified based on a value of the ACK/NACK.

8. The method of claim 7, wherein the first value is different from a second value for a reception of an ACK/NACK without SR by using PUCCH format 0, and
wherein a difference between the first value and the second value is 3, in case that the ACK/NACK includes 1 bit.

9. The method of claim 6, wherein, in case that the first PUCCH format is PUCCH format 0, a value for determining a cyclic shift of a sequence for the PUCCH format 0 for the transmission of the ACK/NACK is added with a predetermined value associated with a positive SR.

10. The method of claim 6, wherein, in case that the first PUCCH format is PUCCH format 1 and the second PUCCH format is PUCCH format 0, the SR is dropped.

11. A terminal in a wireless communication system, the terminal comprising:
a transceiver configured to transmit and receive a signal; and
a controller configured to:
identify that a transmission of an acknowledgement/negative-acknowledgement (ACK/NACK) and a transmission of a scheduling request (SR) overlap in a slot,
transmit, to a base station, the ACK/NACK and the SR in the slot, in case that a first physical uplink control channel (PUCCH) format for the transmission of the ACK/NACK is PUCCH format 0, and
transmit, to the base station, the ACK/NACK without the SR in the slot, in case that the first PUCCH format for the transmission of the ACK/NACK is PUCCH format 1 and a second PUCCH format for the transmission of the SR is PUCCH format 0.

12. The terminal of claim 11, wherein, in case that the first PUCCH format is PUCCH format 0, a first value for determining a cyclic shift of a sequence for PUCCH format 0 is identified based on a value of the ACK/NACK.

13. The terminal of claim 12, wherein the first value is different from a second value for a transmission of an ACK/NACK without SR by using PUCCH format 0, and
wherein a difference between the first value and the second value is 3, in case that the ACK/NACK includes 1 bit.

14. The terminal of claim 11, wherein, in case that on the first PUCCH format is PUCCH format 0, a value for determining a cyclic shift of a sequence for the PUCCH format 0 is added with a predetermined value associated with a positive SR.

15. The terminal of claim 11, wherein, in case that the first PUCCH format is PUCCH format 1 and the second PUCCH format is PUCCH format 0, the SR is dropped.

16. A base station in a wireless communication system, the base station comprising:
a transceiver configured to transmit and receive a signal; and
a controller configured to:
identify that a reception of an acknowledgement/negative-acknowledgement (ACK/NACK) and a reception of a scheduling request (SR) overlap in a slot;
receive, from the terminal, the ACK/NACK and the SR in the slot, in case that a first physical uplink control channel (PUCCH) format for the reception of the ACK/NACK is PUCCH format 0, and
receive, from the terminal, the ACK/NACK without the SR in the slot, in case that the first PUCCH format for the reception of the ACK/NACK is PUCCH format 1 and a second PUCCH format for the reception of the SR is PUCCH format 0.

17. The base station of claim 16, wherein, in case that the first PUCCH format is PUCCH format 0, a first value for determining a cyclic shift of a sequence for PUCCH format 0 is identified based on a value of the ACK/NACK.

18. The base station of claim 17, wherein the first value is different from a second value for a reception of an ACK/NACK without SR by using PUCCH format 0, and
wherein a difference between the first value and the second value is 3, in case that the ACK/NACK includes 1 bit.

19. The base station of claim 16, wherein, in case that the first PUCCH format is PUCCH format 0, a value for determining a cyclic shift of a sequence for the PUCCH format 0 is added with a predetermined value associated with a positive SR.

20. The base station of claim 16, wherein, in case that the first PUCCH format is PUCCH format 1 and the second PUCCH format is PUCCH format 0, the SR is dropped.

* * * * *